(12) United States Patent
Xu et al.

(10) Patent No.: US 9,468,019 B2
(45) Date of Patent: Oct. 11, 2016

(54) METHOD AND APPARATUS FOR ASSIGNING SLOT

(71) Applicant: FUJITSU LIMITED, Kawasaki-shi, Kanagawa (JP)

(72) Inventors: Yi Xu, Beijing (CN); Hao Wang, Beijing (CN); Xiaojing Fan, Beijing (CN); Longteng Yi, Beijing (CN); Jun Tian, Beijing (CN); Taiji Kondo, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 94 days.

(21) Appl. No.: 14/481,080

(22) Filed: Sep. 9, 2014

(65) Prior Publication Data

US 2015/0071218 A1  Mar. 12, 2015

(30) Foreign Application Priority Data

Sep. 10, 2013 (CN) .......................... 2013 1 0408310

(51) Int. Cl.
*H04W 74/00* (2009.01)
*H04W 84/18* (2009.01)
*H04W 74/04* (2009.01)

(52) U.S. Cl.
CPC ........... *H04W 74/002* (2013.01); *H04W 74/04* (2013.01); *H04W 84/18* (2013.01)

(58) Field of Classification Search
CPC .. H04W 74/002; H04W 74/04; H04W 84/18
See application file for complete search history.

(56) References Cited

U.S. PATENT DOCUMENTS

| | | | |
|---|---|---|---|
| 2006/0083197 A1* | 4/2006 | Kang | H04W 74/0841 370/329 |
| 2009/0022136 A1* | 1/2009 | Joshi | H04B 7/2123 370/348 |
| 2009/0154398 A1* | 6/2009 | Isozu | H04W 84/18 370/328 |
| 2011/0013601 A1* | 1/2011 | Cerasa | H04W 28/26 370/336 |
| 2013/0070734 A1* | 3/2013 | Hwang | H04W 74/002 370/336 |

* cited by examiner

*Primary Examiner* — Albert T Chou
(74) *Attorney, Agent, or Firm* — Arent Fox LLP

(57) ABSTRACT

Embodiments of the present invention provide a method and apparatus for assigning slot. Wherein the method includes: constructing an HELLO packet, the HELLO packet including correlation information of multiple reservation slots requested by a local node, or including correlation information of multiple reservation slots requested by a local node and correlation information of multiple reservation slots requested by at least one neighbor node of the local node; and transmitting the HELLO packet, so that a node receiving the HELLO packet authenticates the multiple reservation slots requested by the local node according to information contained in the HELLO packet. With the method and apparatus of the embodiments of the present invention, utilization of slots is improved.

20 Claims, 9 Drawing Sheets

METHOD AND APPARATUS FOR ASSIGNING SLOT

CROSS REFERENCE TO RELATED APPLICATIONS

This application claims priority to Chinese Patent Application No. 201310408310.2, filed Sep. 10, 2013, which is hereby incorporated by reference in its entirety.

TECHNICAL FIELD

The present invention relates to the fields of wireless communications, ad hoc networks and smart power network, and in particular to a method and apparatus for assigning slot.

BACKGROUND ART

An MAC (media access control) layer protocol is designed to guarantee radio resources, such as a slot, a frequency channel, and a spreading code, etc., to a specific transmitter in a network. And for an ad hoc network, such guarantee is provided by handshake or negotiation due to the lack of central management.

Carrier sensing multiple access (CSMA) is the most popular in the MAC layer protocol. Each potential transmitter node must sense the state of a channel before actually transmitting a packet to a network. Collision may happen when the sensing fails to reflect the actual state of the channel, which is referred to as a hidden terminal problem. For a large-scale network where a large number of nodes attempt to transmit packets at the same time, the problem will become very serious. This will result in degradation of quality of service, thereby being unable to satisfy application demands.

Time division multiple access (TDMA) provides an alternative policy for the MAC layer protocol, in which exclusive time slots are reserved for transmission, so as to guarantee higher quality of service. In IEEE (Institute of Electrical and Electronics Engineers) 802.15.4 specification, a portion of a super frame, which is referred to as a collision free period (CFP), is divided for TDMA transmission. And a minimum disposable unit in such period is referred to as a guaranteed time slot (GTS).

However, the IEEE 802.15.4 specification only provides a basic GTS scheduling mechanism for the network in a star topology, which cannot support slot assignment in other sophisticated type of network, especially in the large-scale network and in ad hoc mode.

It should be noted that the above description of the background art is merely provided for clear and complete explanation of the present invention and for easy understanding by those skilled in the art. And it should not be understood that the above technical solution is known to those skilled in the art as it is described in the background art of the present invention.

SUMMARY

A main object of embodiments of the present invention is to provide a method and apparatus for assigning slot, so as to solve the problem mentioned in the Background Art.

According to a first aspect of the embodiments of the present invention, there is provided a node, including:

a constructing unit configured to construct an HELLO packet, the HELLO packet including correlation information of multiple reservation slots requested by the node, or including correlation information of multiple reservation slots requested by the node and correlation information of multiple reservation slots requested by at least one neighbor node of the node; and a transmitting unit configured to transmit the HELLO packet constructed by the constructing unit, so that a node receiving the HELLO packet authenticates the multiple reservation slots requested by the node according to information contained in the HELLO packet;

wherein the correlation information of the multiple reservation slots requested by the node includes: an address of the node, an address of a receiving node of a data packet to be transmitted by the node, and a start slot index and a slot length of the multiple reservation slots requested by the node;

and the correlation information of the multiple reservation slots requested by the neighbor node includes: an address of the neighbor node, an address of a receiving node of a data packet to be transmitted by the neighbor node, a start slot index and a slot length of the multiple reservation slots requested by the neighbor node, a distance from the neighbor node to the node, and confirmation information of the multiple reservation slots requested by the neighbor node.

According to a second aspect of the embodiments of the present invention, there is provided a method for assigning slot, including:

constructing an HELLO packet, the HELLO packet including correlation information of multiple reservation slots requested by a local node, or including correlation information of multiple reservation slots requested by a local node and correlation information of multiple reservation slots requested by at least one neighbor node of the local node; and transmitting the HELLO packet, so that a node receiving the HELLO packet authenticates the multiple reservation slots requested by the local node according to information contained in the HELLO packet.

The advantage of the embodiments of the present invention resides in that with the method and apparatus of the embodiments of the present invention, utilization of slots is improved according to traffic.

With reference to the following description and drawings, the particular embodiments of the present invention are disclosed in detail, and the principle of the present invention and the manners of use are indicated. It should be understood that the scope of the embodiments of the present invention is not limited thereto. The embodiments of the present invention contain many alternations, modifications and equivalents within the spirits and scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "includes/including" when used in this specification is taken to specify the presence of stated features, integers, steps or components but does not preclude the presence or addition of one or more other features, integers, steps, components or groups thereof.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. To facilitate illustrating and describing some parts of the invention, corresponding portions of the drawings may be exaggerated or reduced in size. Elements and features depicted in one drawing or embodiment of the invention may be combined with elements and features depicted in one or more other drawings or embodiments. Moreover, in the drawings, like reference numerals designate corresponding parts in several drawings and may be used to designate like or similar parts in more than one embodiments.

In the drawings.

DETAILED DESCRIPTION OF THE INVENTION

Foregoing and other features of the embodiments of the present invention will become apparent through the following description with reference to the accompanying drawings. These embodiments are illustrative only and are not intended to limit the present invention.

For easy understanding of the principle and embodiments of the present invention by those skilled in the art, the embodiments of the present invention shall be described taking an ad hoc network as an example. However, it should be understood that the present invention is not limited thereto, and is applicable to other multi-hop networks, such as wireless communications, and a smart power grid, etc.

Figure 1:
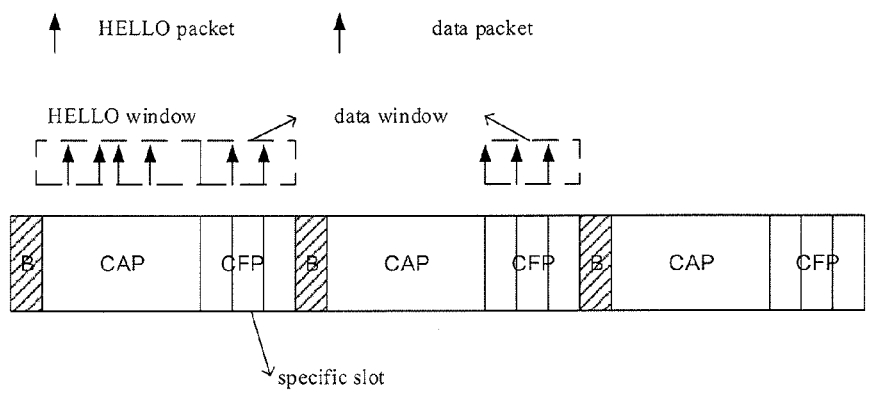
FIG. 1 is a schematic diagram of transmission of an HELLO packet and a data packet in time domain in a distributed manner.

In the embodiments of the present invention, slot assignment is performed in a distributed manner, thereby facilitating implementation of an ad hoc network. A process of the slot assignment involves one type of control packet, that is, an HELLO packet, which is a broadcasting packet and usually used in a route protocol. In order to reserve a valid resource for data packet transmission, the control packet should be transmitted separately. In other words, the data packet and the control packet should be transmitted in different frequencies or time slots or in other types of channels. An example showing separate transmission in time for IEEE 802.15.4 system is depicted in FIG. 1.

Figure 2:
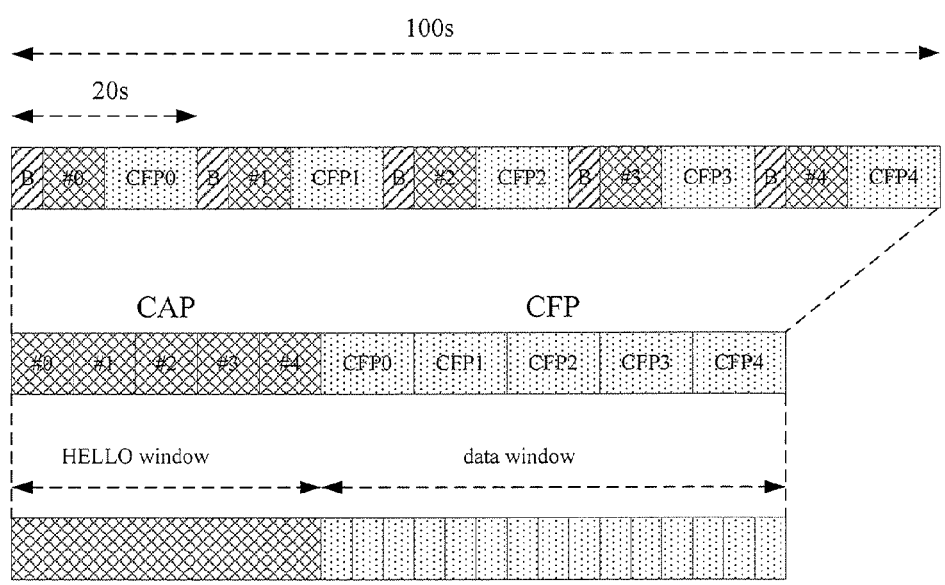
FIG. 2 is a schematic diagram of a frame structure in which a super frame being divided into five groups.

The slot allocation process is done by exchange of control packets, i.e. HELLO packets, each node sends and receives HELLO packets to reserve valid slots for data transmission and to avoid collision. In order to ensure flexibility and efficiency of the assignment, the HELLO packets transmitted in a CAP are not necessarily used for reserving slots in the same super frame, and these HELLO packets may also be used for reserving slots in former or subsequent super frames. In some cases, a certain number of super frames may be grouped to expand the scale of the network. This means that HELLO packets transmitted in any one (CAP) of the super frames are allowed to be used for reserving any slots in these super frames (CFP). FIG. 2 is an example of super frames in one group with the number being set as 5.

The HELLO packets are periodically broadcasted to declare the occupation of specific slots in order to keep other nodes from using the same slots for data transmission, and the period may be in accordance with that of the application requirement. For a static network, such as a smart grid, location of node is barely changed so longer period may be accepted.

In the embodiments of the present invention, an HELLO packet may be divided into two parts, the first part is referred to as an REQ part, indicating a reservation slot requested by a sender of the HELLO packet, i.e. correlation information of multiple reservation slots requested by a local node, and the second part is referred to as an RES part, indicating a response to a request of a neighbor node, i.e. correlation information of multiple reservation slots requested by at least one neighbor node of the local node, corresponding to each neighbor node, a response to a request of the neighbor node being contained. In the first part of the HELLO packet, the reservation slot requested by the sender contains information of four segments, that is, local source ID, local destination ID, a start slot index, and a slot length; and in the second part, each response contains information of following at least six segments, that is, local source ID, local destination ID, a start slot index, a slot length, a distance, and confirmation information.

Figure 3A:
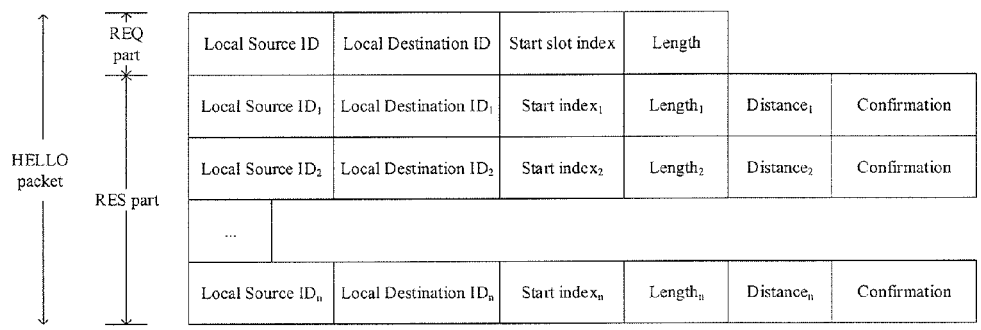
FIG. 3A is a schematic diagram of an implementation mode of a format of an HELLO packet.

FIG. 3A is a schematic diagram of an implementation mode of a format of an HELLO packet. As shown in FIG. 3A, the local source ID represents a transmitter address of a data packet, and the ID is identical to the ID of a sender of an HELLO packet if the HELLO packet is transmitted for reserving a slot for itself. The local destination ID represents a receiver address of a data packet, refers to the ID of the next hop in a multi-hop ad hoc network, and refers to the ID of a parent node if the network is in tree topology. The start slot index represents a preferred start slot expected to be reserved by the local source node, which is selected based on observation on selection of the neighbor node retrieved from the HELLO packet. The length represents a preferred slot length starting from the start slot expected by the local source node. The distance represents the hop count between the local source node and the sender of the HELLO packet. And the confirmation information is feedback from a neighbor node, which indicates consent or dissent (i.e. objection) on whether the local source node is able to reserve its expected slots; and after receiving an HELLO packet, each node should determine the confirmation value if the local source ID is identical to the ID of the sender of the HELLO packet.

Figure 3B:
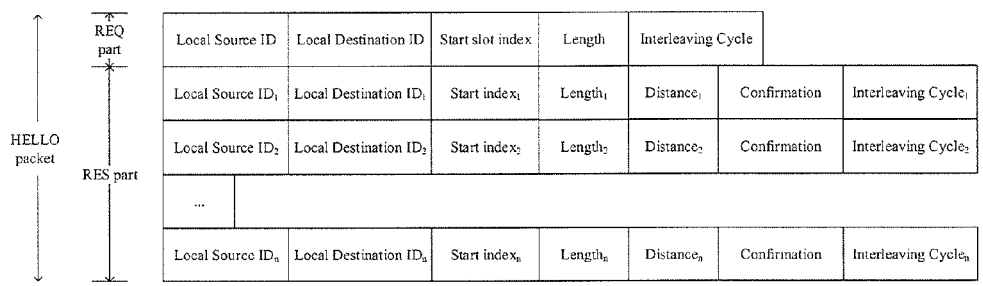
FIG. 3B is a schematic diagram of another implementation mode of a format of an HELLO packet.

FIG. 3B is a schematic diagram of another implementation mode of a format of an HELLO packet. As shown in FIG. 3B, in this implementation mode, besides information identical to that of the HELLO packet shown in FIG. 3A, each information entry further includes an interleaving period of the local source node, so that each local source node maps the requested multiple reservation slots to physical slots according to a predetermined interleaving method, so as to perform data transmission.

In the embodiments of the present invention, in order to record reservation of a neighbor node and track the status update in each slot, each node needs to maintain a local table, the local table containing multiple entries, and each entry at least including items identical to that in an RES part of a received HELLO packet. Corresponding to the implementation mode of FIG. 3A, each entry in the local request table includes six items, that is, local source ID, local destination ID, a start slot index, a length, a distance and confirmation information; and corresponding to the implementation mode of FIG. 3B, each entry in the local request table includes seven items, including the above six items and an interleaving period.

Table 1 shows an example of the local table corresponding to the implementation mode of FIG. 3A. Furthermore, in the embodiments of the present invention, the local table is referred to as a request table or a local request table.

TABLE 1

| Local source ID | Local destination ID | Start slot index | Length | Distance | Confirmation information |
|---|---|---|---|---|---|
| B | A | 3 | 3 | 1 | 1 |
| C | B | 1 | 2 | 2 | 1 |
| D | C | 6 | 1 | 3 | 1 |
| E | A | 2 | 1 | 1 | 0 |

Figure 4:
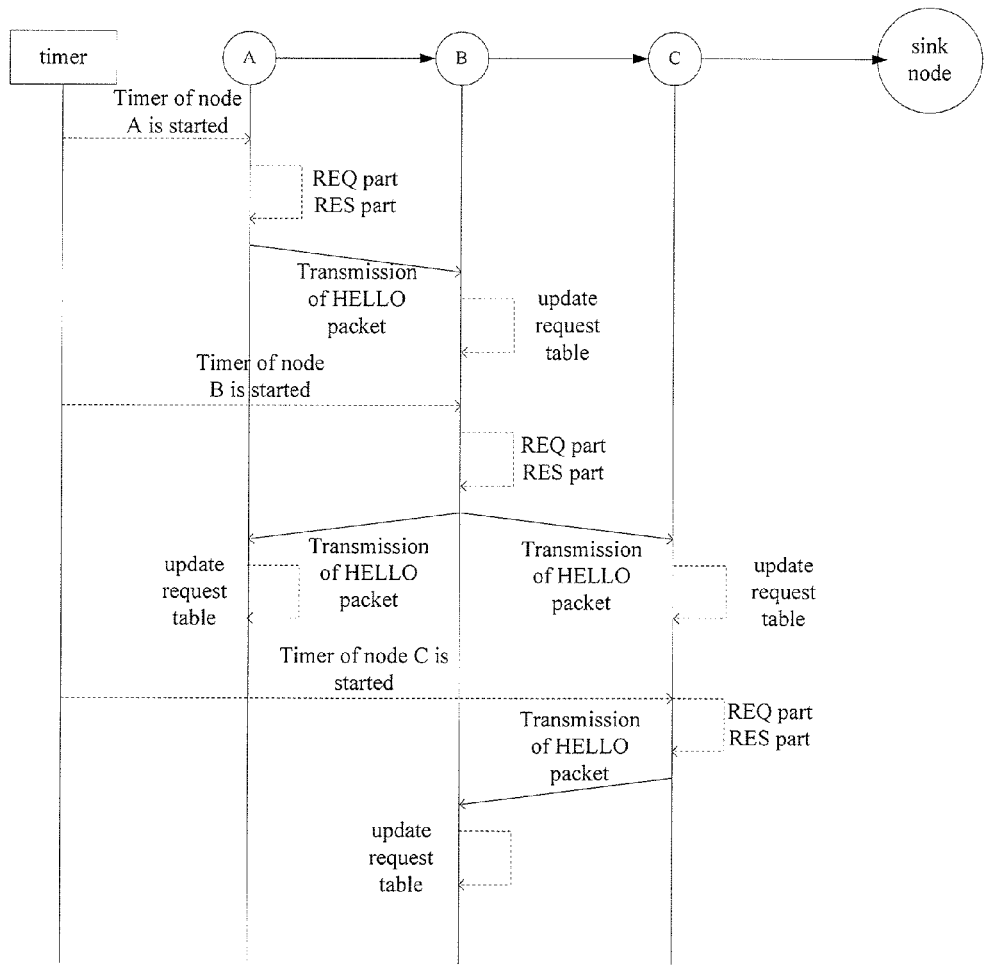
FIG. 4 is an integral flowchart of transmission and receiving of an HELLO packet.

In the embodiment of the present invention, a process of exchange of HELLO packets is as shown in FIG. 4, and transmission of the HELLO packet is scheduled by a local timer. When the local timer is started, a transmission node of an HELLO packet first determines contents of the above-described two parts of the HELLO packet, and constructs the HELLO packet. Once receiving the HELLO packet, one receiving node of the HELLO packet determines a confirmation value related to the REQ part of the HELLO packet based on local observation, such as a local request table, that is, whether consenting to correlation information of the multiple reservation slots requested by the transmission node of the HELLO packet. Furthermore, all information retrieved from the HELLO packet should be used for updating the local request table.

In the embodiments of the present invention, a concept of n-hop collision domain is defined. If two nodes within one collision domain transmit packets simultaneously, collision may possibly occur. Therefore, in the embodiments of the present invention, these nodes are separated in a time zone, so as to avoid occurrence of such a case. Wherein, each node saves information of neighbor nodes within the range of n-hops in the local request table, and cannot select these occupied slots for transmission. Furthermore, each node may select neighbor nodes of 1, 2 to n−1 hops to construct the RES part of its HELLO packet. And each node confirms multiple reservation slots requested by neighbor nodes according to the information of neighbor nodes of the 1, 2 to n−1 hops.

Figure 5:
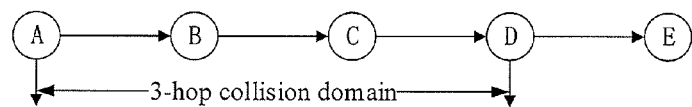
FIG. 5 is a schematic diagram of a 3-hop collision domain.

FIG. 5 gives an example of a 3-hop collision domain. As shown in FIG. 5, node A and node D cannot request identical slots. Node D will take information of node B and node C (a 1-hop neighbor node and a 2-hop neighbor node) into a broadcast flow of the HELLO packet. Therefore, node E will receive the HELLO packet, and will not select a slot identical to those selected by the node B, and node C and the node D. Furthermore, the node E can select a slot identical to that of the node A, as the node A and the node E are not in one collision domain. And if the node E reserves a slot identical to that of the node A, the node D will discover such a case, but will not be able to reject the node E, as the node A is a 3-hop neighbor node of the node D.

In the embodiments of the present invention, each node further saves multiple previously reserved slots and a confirmation result of correlation information of multiple reservation slots requested by it made by a neighbor node, for reference for selecting an idle slot in constructing an HELLO packet at the next time.

In the embodiments of the present invention, in a process of transmission of an HELLO packet, a node needs to find an available idle slot to construct the REQ part of its HELLO packet, and find appropriate information from its request table to construct the RES part of its HELLO packet. The method and apparatus for assigning slot of the embodiments of the present invention shall be described below in detail with reference to the accompanying drawings and particular embodiments.

Embodiment 1

Figure 6:
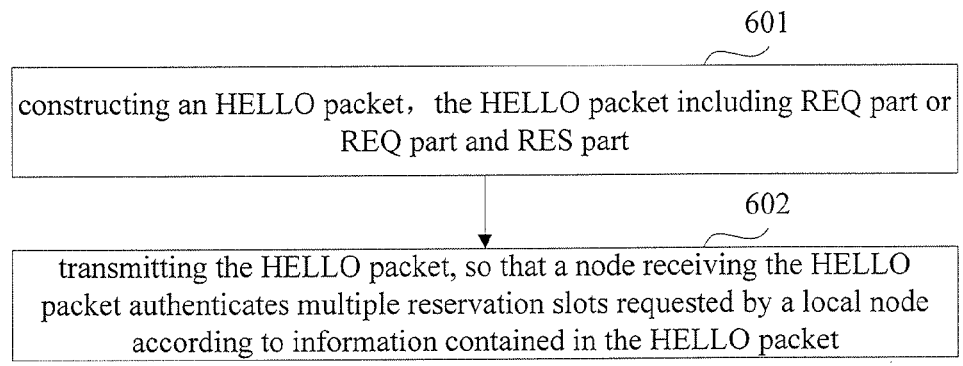
FIG. 6 is a flowchart of a method for assigning slot of an embodiment of the present invention.

An embodiment of the present invention provides a method for assigning slot, applicable to a node in a multi-hop network. FIG. 6 is a flowchart of the method. Referring to FIG. 6, the method includes:

step 601: constructing an HELLO packet, the HELLO packet including correlation information of multiple reservation slots requested by a local node, or including correlation information of multiple reservation slots requested by a local node and correlation information of multiple reservation slots requested by at least one neighbor node of the local node;

wherein, the correlation information of the multiple reservation slots requested by the local node is the above-described REQ part of the HELLO packet, and the correlation information of the multiple reservation slots requested by the at least one neighbor node of the local node is the above-described RES part of the HELLO packet, the contents of the REQ part and the RES part have been described above, and shall not be described herein any further;

in a scenario of this embodiment, when the local node transmits a packet for the first time, it does not store the local request table, since it has not received an HELLO packet from another node; and at this moment, the HELLO packet constructed by it includes only the REQ part;

in another scenario of this embodiment, the local node has received an HELLO packet from another node, and stores and updates the local request table according to information in the HELLO packet; and at this moment, the HELLO packet constructed by it includes the REQ part and the RES part;

step 602: transmitting the HELLO packet, so that a node receiving the HELLO packet authenticates the multiple reservation slots requested by the local node according to information contained in the HELLO packet;

wherein, as described above, in the embodiments of the present invention, the object of constructing the above HELLO packet is to reserve slots for data transmission; after an HELLO packet is constructed, it may be broadcasted and transmitted in an existing manner. And a node receiving the HELLO packet may authenticate the multiple reservation slots requested by the local node according to the information contained in the HELLO packet, determine whether multiple reservation slots requested by it are valid accordingly, update its local request table or update its reservation history information, and construct its HELLO packet according to the method of this embodiment. A particular process of receiving shall be described below.

In this embodiment, as described above, the correlation information of the multiple reservation slots requested by the local node includes: an address of the local node (i.e. an address of a transmission node of a data packet to be transmitted by the local node), an address of a receiving node of the data packet to be transmitted by the local node, a start slot index and a slot length of requested multiple reservation slots; and the correlation information of the multiple reservation slots requested by the neighbor node includes: an address of the neighbor node (i.e. an address of a transmission node of a data packet to be transmitted by the neighbor node), an address of a receiving node of the data packet to be transmitted by the neighbor node, a start slot index and a slot length of the multiple reservation slots requested by the neighbor node, a distance from the neighbor node to the local node (the above transmission node of the HELLO packet), and confirmation information of the multiple reservation slots requested by the neighbor node.

In this embodiment, as described above, the correlation infolination of the multiple reservation slots requested by the local node may further include an interleaving period of the local node; and likewise, the correlation information of the multiple reservation slots requested by the neighbor node may further include an interleaving period of the neighbor node.

Figure 7:
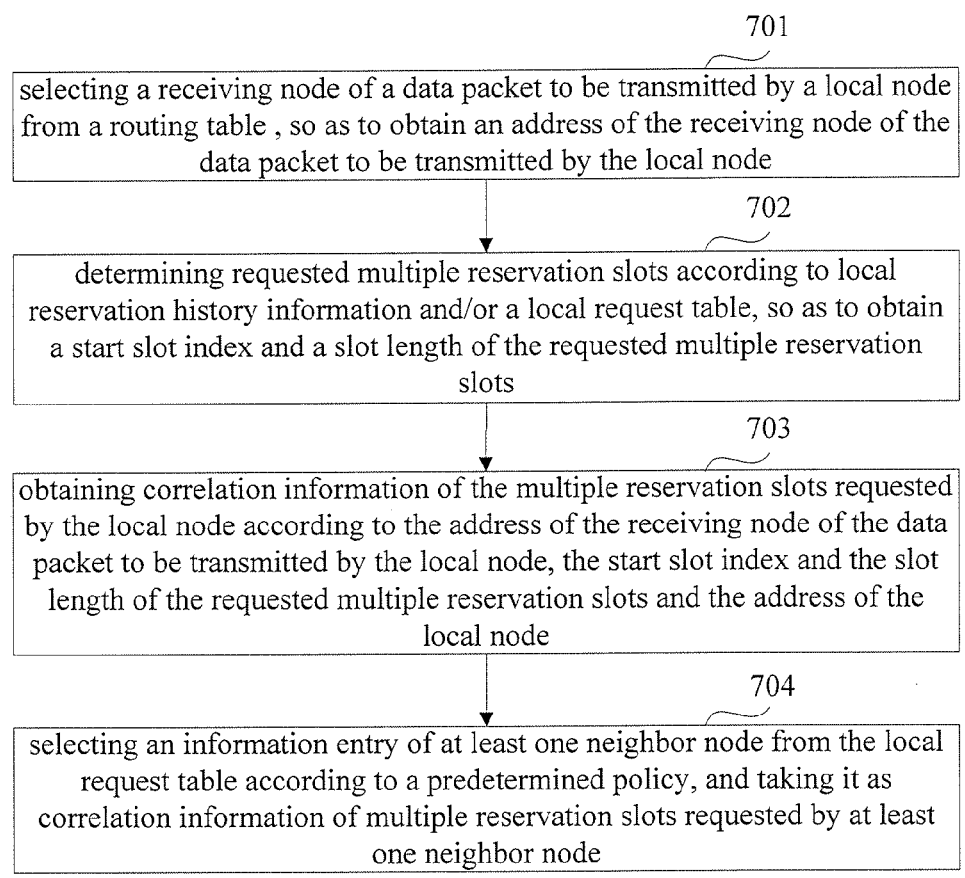
FIG. 7 is a flowchart of an implementation mode of constructing an HELLO packet.

In this embodiment, step 601 may be carried out by the method shown in FIG. 7. Referring to FIG. 7, the method includes:

step 701: selecting the receiving node of a data packet to be transmitted by a local node from a routing table, so as to obtain the address of the receiving node of the data packet to be transmitted by the local node;

wherein, each node maintains a routing table, which indicates multiple paths from the node to a destination node and routing costs of the paths; in this embodiment, a receiving node to which a path of minimal routing cost corresponds may be selected as the receiving node of the data packet to be transmitted, so as to obtain the address of the receiving node;

step 702: determining the requested multiple reservation slots according to local reservation history information and/or a local request table, so as to obtain the start slot index and the slot length of the requested multiple reservation slots;

wherein, step 702 is a step of selecting an idle slot, and a previously selected idle slot may be employed when the previously selected idle slot is valid and no objection is received from a neighbor node within a predetermined period time; otherwise, an idle slot may be re-selected, and a start slot and a slot length of the selected idle slot may be determined, details being going to be described below;

step 703: obtaining the correlation information of the multiple reservation slots requested by the local node according to the address of the receiving node of the data packet to be transmitted by the local node, the start slot index and the slot length of the requested multiple reservation slots and the address of the local node;

wherein, after obtaining the address of the receiving node of the data packet in step 701 and the start slot index and the slot length of the requested multiple reservation slots in step 702, the correlation information of the multiple reservation slots requested by the local node may be constructed, i.e. the REQ part of the HELLO packet; and wherein, in the REQ part, as the HELLO packet reserves a slot for the local node, the local source ID of the REQ part of the HELLO packet is the ID of the local node;

in this embodiment, if an information entry to which a neighbor node corresponds is stored in the local table, the method of FIG. 7 further includes:

step 704: selecting an information entry of the at least one neighbor node from the local request table according to a predetermined policy, and taking it as the correlation information of the multiple reservation slots requested by the at least one neighbor node;

wherein, entries of $1\sim(n-1)$-hop neighbor nodes within an n-hop collision domain of the local node may be selected from the local request table as the correlation information of the multiple reservation slots requested by the at least one neighbor node, or entries of all one-hop neighbor nodes and entries with confirmation information being consent in entries of $2\sim(n-1)$-hop neighbor nodes within an n-hop collision domain of the node may be selected from the local request table as the correlation information of the multiple reservation slots requested by the at least one neighbor node; and the more entries are constructed in the HELLO packet, the larger an area of reservation information contained in the HELLO packet that can be reached, and lower collision probability could be guaranteed.

Figure 8:
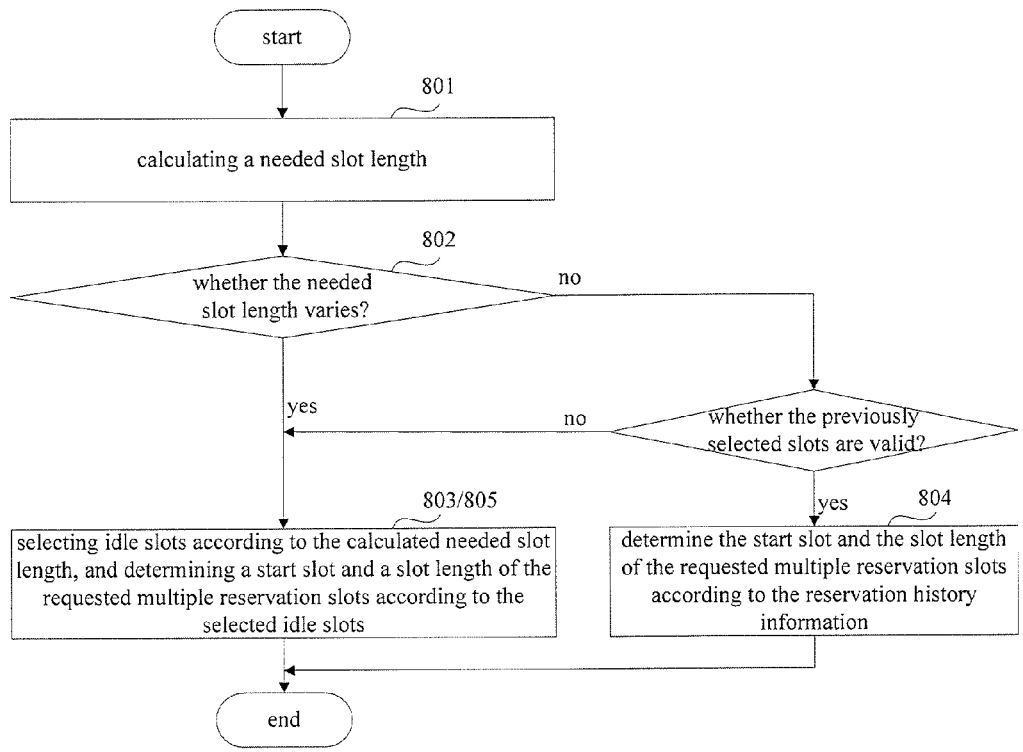
FIG. 8 is a flowchart of determining requested multiple reservation slots.

In step 702, the step of determining the requested multiple reservation slots may be carried out by the method shown in FIG. 8. Referring to FIG. 8, the method includes:

step 801: calculating a needed slot length;

wherein, the needed slot length may be obtained through calculation based on an absolute number of traffic, and may also be obtained through calculating based on a ratio of traffic in the n-hop collision domain; however, this embodiment is not limited thereto, and other methods for calculating a needed slot length occurred to those skilled in the art within the spirits and scope of the present invention are all covered in the protection scope of the present invention;

wherein, the calculation of a needed slot length based on an absolute number of traffic is to calculate a needed slot length according to a sum of lengths of slots reserved by all children nodes of the local node;

it is assumed that each node generates a packet and expects to transmit the packet to a sink node; and if the local node has K children nodes and each child node i applies for length, transmission slots, the needed slot length of the local node may be obtained through calculation by using the following formula:

$$\text{length} = 1 + \sum_{i=1}^{K} \text{length}_i;$$

that is, the children nodes are those indicated in the entries of the local table of which destination node ID is source node ID of the local node;

wherein, the calculation of a needed slot length based on a ratio of traffic in the n-hop collision domain is to calculate the needed slot length according to traffic of a neighbor node in the collision domain of the local node;

it is assumed that a neighbor node j is in the n-hop collision domain of the local node and applies for length$_j$ transmission slots, and the local node has N neighbor nodes in the n-hop collision domain, the needed slot length of the local node may be obtained through calculation by using the following formula:

$$length = \frac{1 + \sum_{i=1}^{K} length_i}{1 + \sum_{i=1}^{K} length_i + 1 + \sum_{j=1}^{N} length_j} \cdot S_{total};$$

where, $S_{total}$ denotes a total number of guaranteed slots in the collision domain, such as one HELLO packet interval, or a super frame, etc.; that is, it refers to a period of a slot that can be reserved;

step 802: determining whether the needed slot length varies according to the locally saved reservation history information;

wherein, as described above, each node may save the correlation information of the multiple previously reserved slots, such as a start slot, a slot length, and a flag, etc., which is referred to as reservation history information in this embodiment; and the previously reserved slot length may be compared with the calculated needed slot length according to the reservation history information, so as to determine whether the needed slot length varies;

step 803: selecting idle slots according to the calculated needed slot length if the needed slot length varies, and determining a start slot and a slot length of the requested multiple reservation slots according to the selected idle slots;

wherein, according to the judgment in step 802, if it varies, idle slots need to be re-selected.

Figure 9:
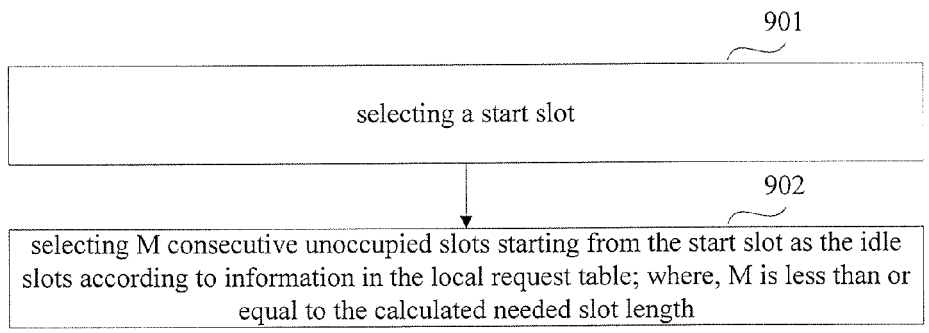
FIG. 9 is a flowchart of selecting an idle slot.

In an implementation mode, the step of selecting the idle slots may be carried out by the method shown in FIG. 9. Referring to FIG. 9, the method includes:

step 901: selecting a start slot; and step 902: selecting M consecutive unoccupied slots starting from the start slot as the idle slots according to information in the local request table; where, M is less than or equal to the calculated needed slot length.

In step 901, an idle start slot may be selected based on information contained in the request table.

In an implementation mode, the start slot may be randomly selected from the slots unoccupied by other nodes in the n-hop collision domain, that is, selecting randomly an unused slot from a preconfigured slot set as the start slot.

In an implementation mode, the start slot may be determined by a function of the local node, that is, selecting a slot of a slot index being a function of the address of the local node from a preconfigured slot set as the start slot; for example, the function may be:

$s_i = f(ID_i) = ID_i \mod K;$ where, K indicates a total number of slots.

In an implementation mode, the start slot may be determined by a function of hop count, that is, selecting an unused slot from a preconfigured slot set to which the hop count corresponds according to the hop count of the local node as the start slot. As shown in Table 2, an i-th-hop node can only select a start idle slot from a set

TABLE 2

| Number of hops (i) | Set of available slots ($k_i$) |
|---|---|
| 8 | 1, 2, 3, . . . , 8 |
| 7 | 1, 2, 3, . . . , 16 |
| 6 | 1, 2, 3, . . . , 32 |
| 5 | 1, 2, 3, . . . , 64 |
| 4 | 1, 2, 3, . . . , 128 |
| 3 | 1, 2, 3, . . . , 256 |
| 2 | 1, 2, 3, . . . , 512 |
| 1 | 1, 2, 3, . . . , 1024 |

In an implementation mode, the start slot may further be determined based on observation on the occupied slots. For example, the selected slot may be an first idle slot that is not occupied by other nodes; or a maximum idle slot interval between two occupied slots is found, and an intermediate one is selected as an appropriate slot. In such a case, a maximum idle slot interval between two occupied slots may be guaranteed.

Figure 10:
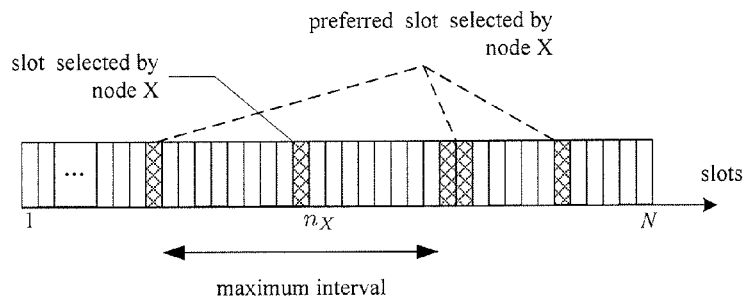
FIG. 10 is a schematic diagram of an implementation mode of selecting an idle slot.

FIG. 10 shows an example of selecting a start slot.

It should be noted that the above methods for selecting slots are examples only, and the embodiments of the present invention are not limited thereto. And wherein, the preconfigured slot set may be a data part of a designated frame in a predetermined HELLO packet interval, and may also be data parts of all frames in a predetermined HELLO packet interval.

In step 902, whether all slots in a range from the start slot to an ending slot passing the needed slot length are idle may be determined first according to the information in the local request table, and if all the slots in the range are idle, it may be determined that the M consecutive slots containing the start slot are the idle slots. In such a case, M is the needed slot length. Furthermore, if at least one slot in the range is occupied, that is, multiple consecutive slots satisfying the needed slot length taking the start slot selected in step 901 as a starting point cannot be found, a first idle slot after the last occupied slot in the range is taken as the start slot, and similar processing is performed turning back to step 902.

In step 902, there exists a case where there are no consecutive unoccupied idle slots of the number of the needed slot length according to the information in the local request table. At this moment, the needed slot length may be reduced, and similar processing is performed turning back to step 901.

With the method of FIG. 9, idle slots may be selected, thereby determining the start slot and the slot length of the idle slots, and constructing the REQ part of the HELLO packet.

Step 804: determine the start slot and slot length of the requested multiple reservation slots according to the reservation history information if the needed slot length does not vary and the previously selected slots are determined as being valid according to the reservation history information;

wherein, according to the judgment in step 802, if the needed slot length does not vary and the previously selected slots are valid, the previously reserved slots may be directly taken as idle slots requested this time, and the start slot and the slot length may be determined accordingly;

step 805: selecting idle slots according to the calculated needed slot length and determining the start slot and the slot length of the requested multiple reservation slots according to the selected idle slots if the needed slot length does not vary but the previously selected slots are determined as being invalid according to the reservation history information;

wherein, according to the judgment in step 802, if the needed slot length does not vary but the previously selected slots are invalid, the idle slots need to be re-selected, a method of selection being similar to the method for selecting an idle slot in step 803, or may be carried out by the method of FIG. 9, which shall not be described herein any further.

For the method of this embodiment to be more clear and easy to be understood, the method of this embodiment shall be described below taking a process of transmission of an HELLO packet as an example.

Figure 11:
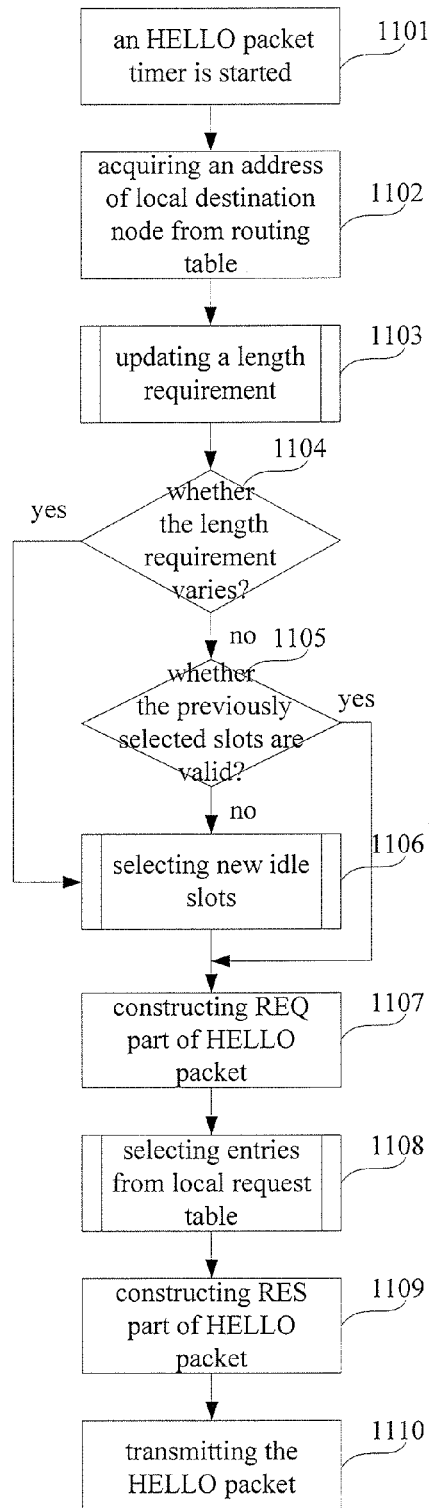
FIG. 11 is a flowchart of transmission of an HELLO packet.

FIG. 11 is a flowchart of transmission of an HELLO packet according to the method of this embodiment. Referring to FIG. 11, the flow includes:

step 1101: an HELLO packet timer is started;

step 1102: acquiring an address of the local destination node from the local routing table;

as described above, a receiving node of a path of a minimal routing cost may be selected as the local destination node, thereby the local destination address may be obtained;

step 1103: updating a length requirement;

as described above, the needed slot length is calculated via the above-described method;

step 1104: judging whether the length requirement varies, executing step 1105 if it does not vary, and executing step 1106 if it varies;

as described above, in comparison with the locally saved reservation history information, whether the needed slot length varies is judged;

step 1105: judging whether the previously selected slots are valid, executing step 1106 if they are invalid, and executing step 1107 if they are valid;

step 1106: selecting new idle slots;

as described above, the new idle slots may be selected via the method of FIG. 9;

step 1107: constructing the REQ part of the HELLO packet;

step 1108: selecting entries from the local request table;

as described above, entries of 1, 2, . . . ~(n−1)-hop neighbor nodes in the n-hop collision domain may be selected, or entries of all 1-hop neighbor nodes in the n-hop collision domain and entries of 2~(n−1)-hop neighbor nodes in the n-hop collision domain with confirmation information being consent may be selected;

step 1109: constructing the RES part of the HELLO packet; and step 1110: transmitting the HELLO packet.

By constructing and transmitting the HELLO packet via the method of this embodiment, slot reservation may be performed efficiently, and utilization of slots is improved.

In an embodiment of the present invention, if an HELLO packet is received, multiple reservation slots requested by the transmission node of the HELLO packet may be authenticated according to the received HELLO packet, such as granting consent or objection to the multiple reservation slots requested by the sender of the HELLO packet. And whether multiple reservation slots requested by the local node are valid may be determined according to the received HELLO packet. Furthermore, the local request table or the local reservation history information may be updated according to the received HELLO packet.

Wherein, contents contained in the received HELLO packet are identical to those contained in the above-described constructed HELLO packet, that is, only the REQ part, i.e. the correlation information of the multiple reservation slots requested by the sender of the HELLO packet, may be contained, or both the REQ part and the RES part may be contained, that is, both the correlation information of the multiple reservation slots requested by the sender of the HELLO packet and the correlation information of the multiple reservation slots requested by at least one neighbor node of the transmission node of the HELLO packet are contained.

In this embodiment, the authentication (granting local comment on whether agree) of the multiple reservation slots requested by the sender of the HELLO packet according to the REQ part of the received HELLO packet may be carried out by comparing the multiple reservation slots requested by the REQ part with some of the entries in the local request table.

In an implementation mode, the REQ part of the received HELLO packet is compared with the entries of the 1, 2, . . . ~(n−1)-hop neighbor nodes in the n-hop collision domain with confirmation information being consent in the local request table, so as to determine whether the multiple reservation slots requested by the sender of the HELLO packet are occupied; if they are occupied, it will be deemed that there exists collision, and at this moment, the local node will grant objection to the multiple reservation slots requested by the sender of the HELLO packet; and on the contrary, if they are not occupied, it will be deemed that there exists no collision, and at this moment, the local node will grant consent to the multiple reservation slots requested by the sender of the HELLO packet.

Wherein, after granting consent or objection to the multiple reservation slots requested by the sender of the HELLO packet, the local node may update the local request table accordingly. For example, in case of objection, the confirmation information is set to be objection (confirmation=0), and the entry is added into the local request table; and in case of consent, the confirmation information is set to be consent (confirmation=1), and the entry is added into the local request table. On the other hand, in case of consent, the local node may further confirm whether the multiple reservation slots requested by the sender of the HELLO packet collide with the multiple reservation slots requested by the local node; if they do not collide, it will be deemed that the multiple reservation slots requested by the local node are valid, and at this moment, the local reservation history information will be kept unchanged; and if they collide, it will be deemed that the multiple reservation slots requested by the local node are invalid, and at this moment, the local reservation history information needs to be modified. For example, the status indicated by the local reservation history information is modified into being invalid, or indices of the multiple reservation slots requested by the local node indicated by the local reservation history information are modified into a specific value, etc.

In this embodiment, alternatively, before the authentication of the multiple reservation slots requested by the sender of the HELLO packet, whether the REQ part has been received may be confirmed first; if yes, it shows that the REQ part has been processed and is old, and at this moment, the process is terminated directly; if no, it shows that the REQ part has not been processed and is new, and at this moment, the multiple reservation slots requested by sender of the HELLO packet are authenticated. Wherein, the determination of whether the REQ part has been received may be carried out by comparing it with the local request table; if the REQ part exists in the local request table (the local request table containing an information entry with local source ID, local destination ID, start index and length being identical to that of the received REQ part), it will be deemed that the REQ part has been received; otherwise, it will be deemed that the REQ part has not been received.

In this embodiment, alternatively, before the authentication of the multiple reservation slots requested by the sender of the HELLO packet, whether the REQ part is valid may be confirmed first. For example, whether the REQ part is valid may be confirmed by judging whether an index of a requested reservation slot indicated by the REQ part is greater than or equal to 0; if it is greater than or equal to 0, it shows that the sender of the HELLO packet requests a valid reservation slot, and the multiple reservation slots requested by the sender of the HELLO packet are authenticated; and if it is less than 0, it shows that the sender of the HELLO packet requests an invalid reservation slot, or, in other words, the sender of the HELLO packet does not expect to reserve a slot, and at this moment, an information entry corresponding to the REQ part is added into the local request table; wherein, confirmation information to which the newly-added entry corresponds may be of a specific value.

The above implementation modes are examples only, and in other implementation modes of this embodiment, the comparison may also be carried out with entries of other neighbor nodes according to a predetermined policy, rather than the entries of the 1, 2, . . . ~(n−1)-hop neighbor nodes in the n-hop collision domain, so as to determine whether the occupied slots collide. Manners of comparison are similar, and shall not be described herein any further.

With the above processing, both the authentication of the multiple reservation slots requested by the sender of the received HELLO packet and update of the local request table or the local reservation history information based on the REQ part of the received HELLO packet are finished.

In this embodiment, whether the multiple reservation slots requested by the local node are valid is confirmed according to the information of the RES part of the HELLO packet, and the local request table or the local reservation history information is updated accordingly, which may be carried out by traversing each RES entry of the RES part.

Wherein, RES entry with a local source node address being the address of the local node is the correlation information of the multiple reservation slots requested by the local node, and the confirmation information to which the RES entry corresponds is an authentication result given by another node to the multiple reservation slots requested by the local node. If the authentication result is consent, it is confirmed that the multiple reservation slots requested by the local node are valid, and at this moment, the local reservation history information needs not to be modified; and on the contrary, if the authentication result is objection, it is confirmed that the multiple reservation slots requested by the local node are invalid, and at this moment, the locally saved reservation history information needs to be modified. For example, flag of the requested multiple reservation slots in the locally saved reservation history information is modified into being invalid, or a start slot and a slot length of the requested multiple reservation slots in the locally saved reservation history information are directly set to be numbers less than 0, etc.

Wherein, for RES entries with a local source address being not the address of the local node, the local request table needs to be updated according to these RES entries. For example, for a certain RES entry, it is compared with the entries in the local request table, and when the local source node address of the RES entry is new, that is, this entry is not stored in the local request table, such an entry is added into the local request table, and 1 is added to its distance; and when the local source node address of the RES entry is old, that is, this entry is stored in the local request table, the distance of the RES entry is compared with a distance of a corresponding entry in the local request table; if the distance of the RES entry is greater than or equal to the distance of the corresponding entry in the local request table, the processing of the RES entry is done, and a next RES entry may be acquired; and if the distance of the RES entry is less than the distance of the corresponding entry in the local request table, confirmation information to which the RES entry corresponds is checked; if the confirmation information is objection (confirmation=0), it shows that the RES entry has no effect on the requested reservation slots to which the entries in the local request table correspond, and 1 is added to the distance of the RES entry, which is taken as the distance of the corresponding entry in the local request table; and if the confirmation information is consent (confirmation=1), confirmation information of all the one-hop neighbor nodes in the local request table needs to be updated accordingly. For example, if the requested reservation slots in the entries to which the one-hop neighbor nodes in the local request table correspond collide with the requested multiple reservation slots to which the RES entry corresponds, the confirmation information of the entries to which the one-hop neighbor nodes correspond is modified into objection; otherwise, the confirmation information to which the one-hop neighbor nodes correspond is modified into consent, and 1 is added to the distance of the RES entry, which is taken as the distance of the corresponding entry in the local request table.

Wherein, in processing each RES entry, whether the RES entry is valid should be determined first, likewise, it may also be determined through comparison with the local request table; and if such an entry has not been received before, it shall be deemed that the RES entry is new, thereby determining that the RES entry is valid; otherwise, it shall be deemed that the RES entry is old, thereby determining that the RES entry is invalid.

Figure 12:
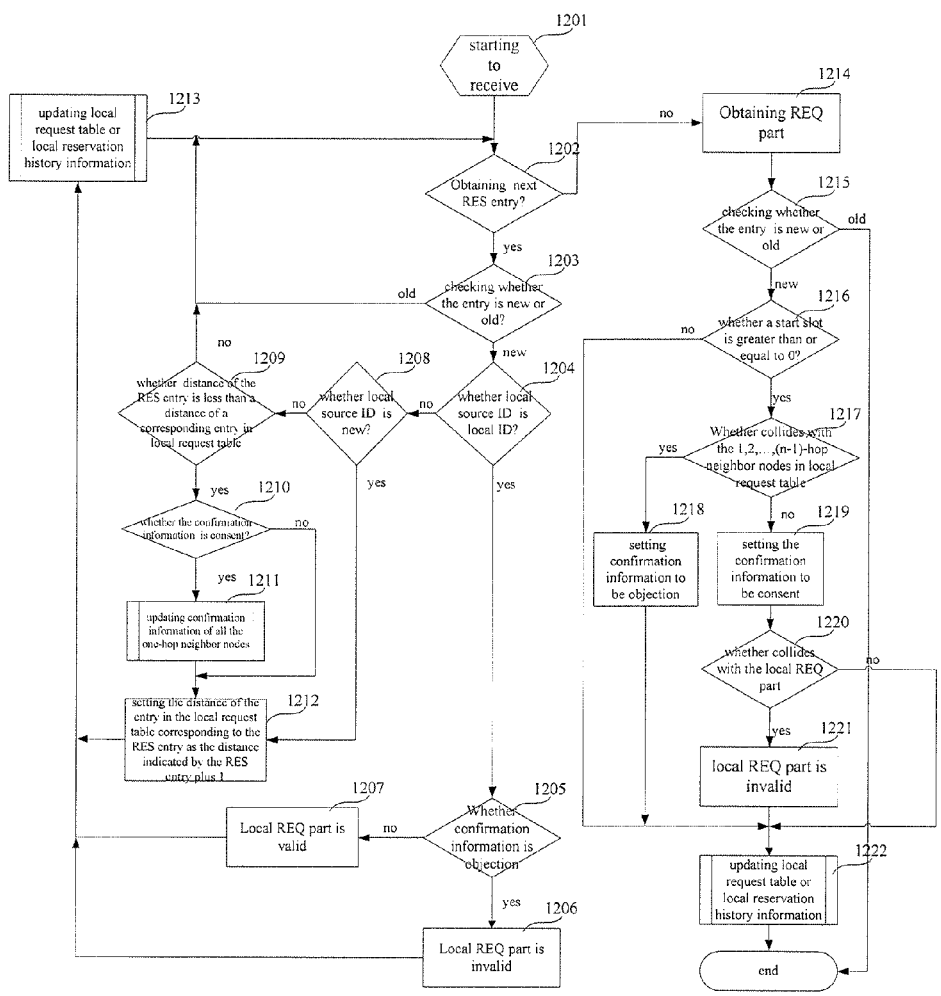
FIG. 12 is a flowchart of receiving an HELLO packet.

FIG. 12 is a flowchart of receiving an HELLO packet according to the method of an embodiment of the present invention. Referring FIG. 12, the flow includes:

step 1201: starting to receive;

step 1202: judging whether a next RES entry is obtained, if yes, executing step 1203, otherwise, executing step 1214;

wherein, if the next RES entry is obtained, the next RES entry is processed; and if the next RES entry is not obtained, it shows that processing of all the RES entries is finished, and at this moment, turn to step 1214 to process the REQ part;

step 1203: checking whether the RES entry is new or old, if it is new, executing step 1204; otherwise, turning back to step 1202 to continue to acquire a next RES entry;

wherein, determining whether the RES entry is new or old may be performed by comparing with the entries in the local request table; and if the RES entry is stored and the information indicated by the RES entry does not vary, it shows that the RES entry is old; otherwise, it shows that the RES entry is new;

step 1204: judging whether local source ID of the RES entry is local ID, if yes, executing step 1205, otherwise, executing step 1208;

wherein, if the local source ID of the RES entry is local ID, it shows that the RES entry is correlation information corresponding to the multiple reservation slots requested by the local node; and the RES entry contains confirmation information of the multiple reservation slots requested by the local node;

step 1205: judging whether confirmation information of the RES entry is consent, and if it is objection, executing step 1206, and if it is consent, executing step 1207;

step 1206: determining that the multiple reservation slots requested by the local node are invalid, and turning back to step 1213;

wherein, as the RES entry is the correlation information corresponding to the multiple reservation slots requested by the local node and the correlation information of the multiple reservation slots requested by the local node is in the locally saved reservation history information, rather than in the request table, no processing is performed to the local request table after turning back to step 1213, but the locally saved reservation history information is updated; for example, if flag in the locally saved reservation history information is valid, it is modified into being invalid, and then go to or at the same time turn back to step 1202 to acquire a next RES entry;

step 1207: determining that the multiple reservation slots requested by the local node are valid, and turning back to step 1213;

wherein, similar to step 1206, no processing is performed to the local request table after turning back to step 1213, but the locally saved reservation history information is updated; for example, if flag in the locally saved reservation history information is invalid, it is modified into being valid, and then go to or at the same time turn back to step 1202 to acquire a next RES entry;

step 1208: judging whether the local source ID of the RES entry is new, if yes, executing step 1212, otherwise, executing step 1209;

step 1209: judging whether the distance of the RES entry is less than a distance of a corresponding entry in the local request table, if yes, executing step 1210, otherwise, turning back to step 1202;

step 1210: judging whether the confirmation information of the RES entry is consent, and if yes, executing step 1211, otherwise, executing step 1212;

step 1211: updating confirmation information of all the one-hop neighbor nodes in the local request table;

as described above, the RES entry is compared with the entries to which all the one-hop neighbor nodes in the local request table correspond, and if the requested reservation slots indicated by the RES entry collide with the requested reservation slots indicated by entries to which the one-hop neighbor nodes with confirmation information being consent in the local request table correspond, the confirmation information of the one-hop neighbor nodes is modified into objection;

step 1212: setting the distance of the entry in the local request table corresponding to the RES entry as the distance indicated by the RES entry plus 1, and turning back to step 1213;

step 1213: updating the local request table or updating the local reservation history information;

as described above, as the information indicated by the RES entry is different, manner of updating the local request table or updating the local reservation history information are different;

step 1214: obtaining the REQ part;

step 1215: checking whether the entry of the REQ part is new or old, if it is old, terminating the processing, and if it is new, executing step 1216;

wherein, if the entry is stored in the local request table and the information indicated by the entry is identical to each piece of information in the REQ part, it shows that the entry is old; otherwise, it shows that the entry is new;

step 1216: judging whether a start slot of the entry is greater than or equal to 0, if yes, executing step 1217; otherwise, executing step 1222;

wherein, if the start slot of the entry is less than 0, it shows that the sender of the HELLO packet does not request a valid slot, and at this moment, the local request table is updated directly; for example, the entry is added into the local request table;

step 1217: judging whether the entry collides with the 1, 2, . . . , (n−1)-hop neighbor nodes in the local request table, if yes, executing step 1218; otherwise, executing step 1219;

step 1218: setting confirmation information of the entry to be objection, and then executing step 1222 to update the local request table;

wherein, as collision occurs, the sender of the HELLO packet may not use the reservation slots requested by it, and objection is granted to the multiple reservation slots requested by it, and it is added into the local request table;

step 1219: setting the confirmation information of the entry to be consent, and then executing step 1220;

wherein, as no collision occurs, the sender of the HELLO packet may use the reservation slots requested by it, and consent is granted to the multiple reservation slots requested by it;

step 1220: judging whether the entry collides with the local REQ part, if yes, executing step 1221; otherwise, executing step 1222;

step 1221: determining that the local REQ part is invalid, and executing step 1222 to update the local request table;

wherein, although the entry does not collide with the entries in the local request table, it collides with the local REQ part, and at this moment, it is deemed that the local node may not use the requested reservation slots, and the flag of the requested multiple reservation slots in the locally saved reservation history information is modified into being invalid; furthermore, the entry with the confirmation information being set as valid needs to be added into the local request table;

step 1222: updating the local request table or the local reservation history information;

as described above, the local request table is updated based on different procedures of processing.

In the description of FIG. 12, the received HELLO packet including an REQ part and an RES part is taken as an example. However, this embodiment is not limited thereto. As described above, in an implementation mode, such as in a process of constructing an HELLO packet for the first time, as no local request table is stored, the constructed HELLO packet includes only the REQ part, and at this moment, a node receiving such an HELLO packet needs only to authenticate the multiple reservation slots requested by the sender of the HELLO packet (granting consent or objection), and updates its local request table or its local reservation history information accordingly, that is, only steps 1214-1222 need to be executed, which shall not be described herein any further.

With the method of the embodiments of the present invention, a received HELLO packet may be correspondingly processed, which may reserve slots and construct an HELLO packet more efficiently, thereby improving utilization of slots.

In the embodiments of the present invention, after reserving multiple slots and obtaining a slot set of the multiple reservation slots successfully, the multiple reservation slots in the slot set may be mapped onto physical slots in some interleaving manners, so as to transmit data in the interleaved slots, thereby further improving efficiency of slot allocation.

Wherein, in order to indicate an interleaving period of each node, a segment of an interleaving period needs to be added into the HELLO packet, as shown in FIG. 3B. Wherein, the interleaving period indicates whether slots interleaving is used; for example, if the period is 0, no slots interleaving is used, and if the period is not 0, slots interleaving is used; and wherein, the number is equal to the interleaving period.

Wherein, the slots after interleaving correspond to the slots before interleaving one by one. An interleaved slot of Slot [i] may be indicated by $Slot_{interleaving}[i]$.

Wherein, the period represents a write-in period of interleaving, and $S_{total}$ represents the number of available slots in an allocation period.

Figure 13:
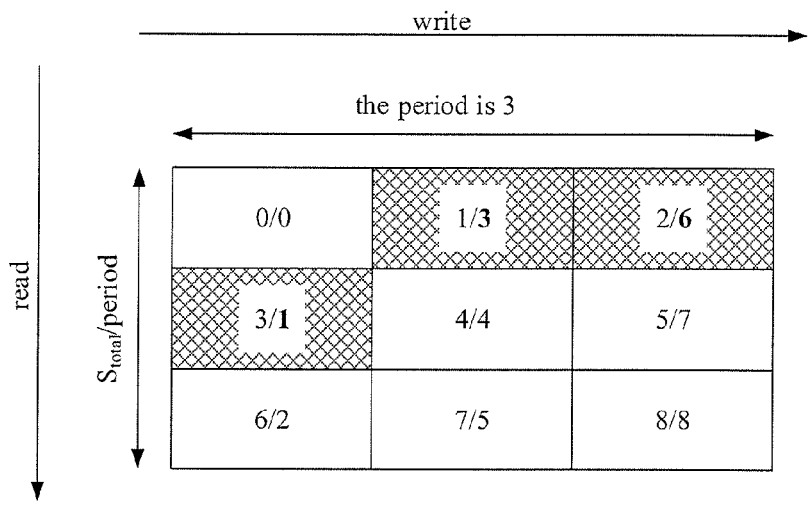
FIG. 13 is a schematic diagram of slots before and after being interleaved when a period being 3.

FIG. 13 gives an example of interleaving allocation when the period is 3. As shown in FIG. 13, after slot allocation in the method of the embodiment of the present invention, a result of slots 1, 2, 3 is obtained, and after interleaving allocation, the result is changed into slots 1, 3, 6.

The method of interleaving of FIG. 13 is an example only, and the embodiment of the present invention is not limited thereto. Other methods of interleaving in the prior art may also be applicable.

With the method for assigning slot of this embodiment, utilization of slots may be improved.

In the embodiments of the present invention, after all the nodes in a network reserve slots, the local request table of each node will vary no longer. At this moment, each node may expand its reserved slots by using identical rules, thereby further improving efficiency of data transmission.

Figure 14:
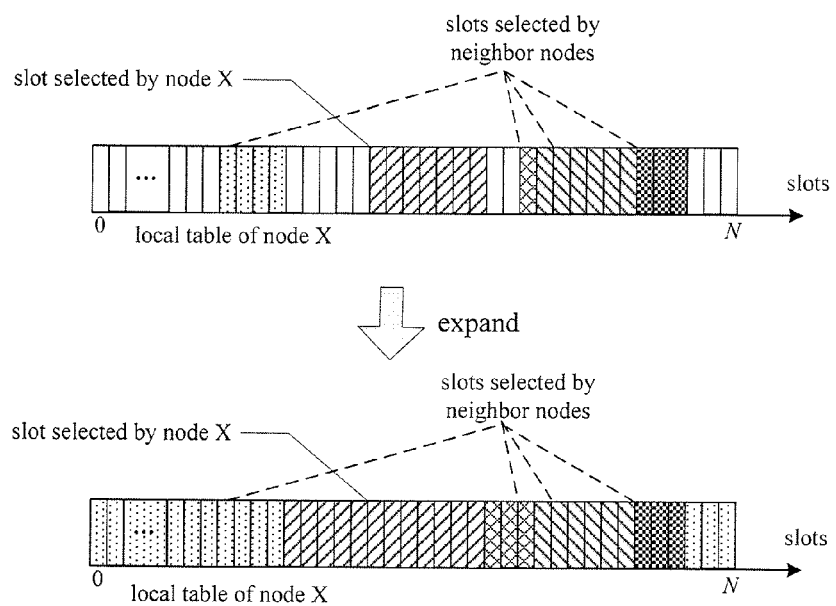
FIG. 14 is a schematic diagram of expanding reservation slots.

FIG. 14 is an embodiment of expanding leftwards. As shown in FIG. 14, a node occupies an idle slot to the left of the slot reserved by itself according to the local table, and then broadcasts via an HELLO packet. Wherein, if there exists no idle slot at the left, occupation is not expanded.

Wherein, expanding leftwards is just an example, and the embodiment of the present invention is not limited thereto. Expansion may be performed according to other rules, such as expanding rightwards.

An embodiment of the present invention further provides a node, as described in Embodiment 2 below. As the principle of the node for solving problems is similar to that of the method of Embodiment 1, the implementation of the method may be referred to for the implementation of the node, and the identical contents shall not be described any further.

Embodiment 2

Figure 15:
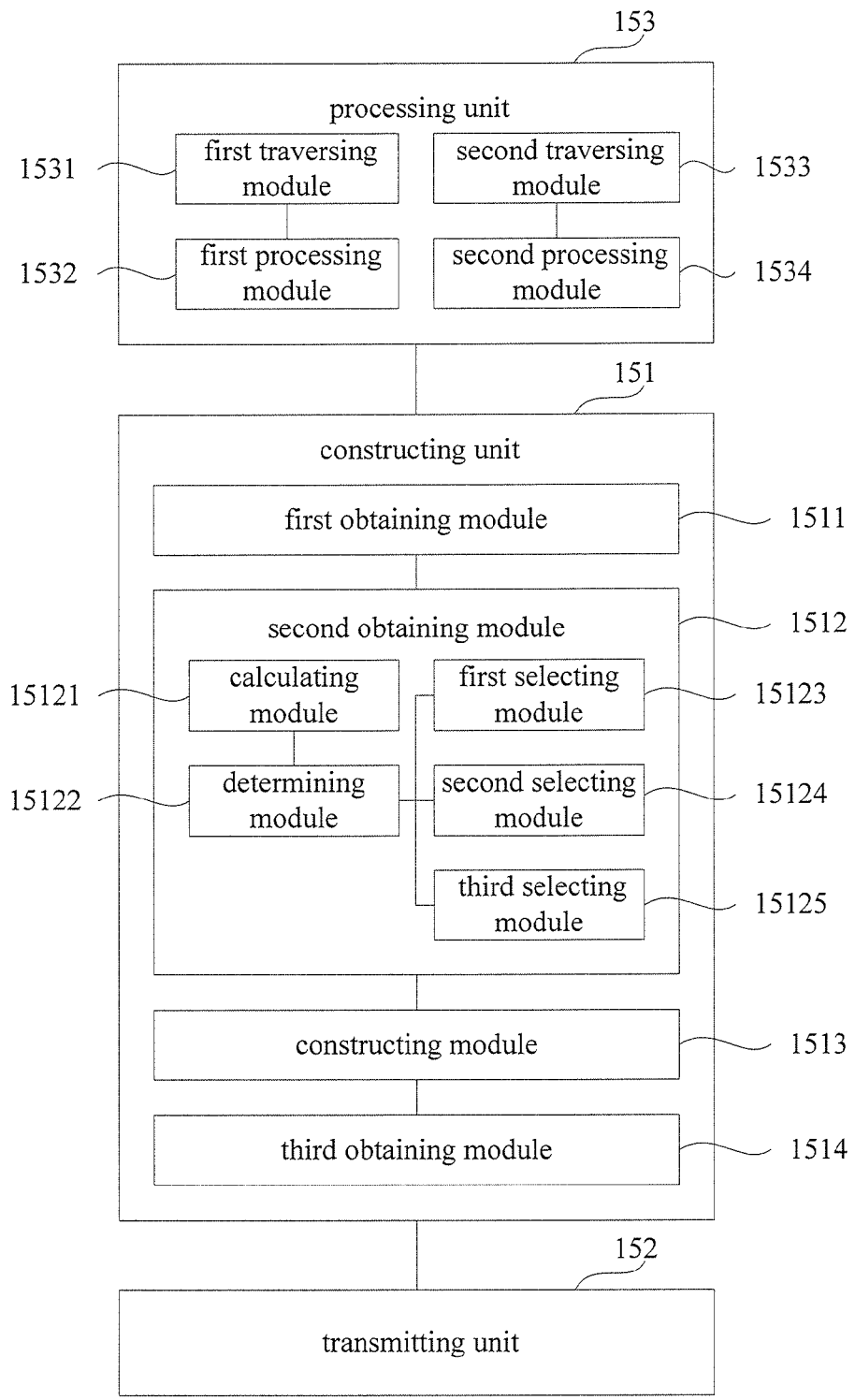
FIG. 15 is a schematic diagram of the structure of a node of an embodiment of the present invention.

An embodiment of the present invention further provides a node in a multi-hop network. FIG. 15 is a schematic diagram of the structure of the node. Referring to FIG. 15, the node includes:

a constructing unit 151 configured to construct an HELLO packet, the HELLO packet including correlation information of multiple reservation slots requested by the node (an REQ part), or including correlation information of multiple reservation slots requested by the node (an REQ part) and correlation information of multiple reservation slots requested by at least one neighbor node of the node (an RES part); and a transmitting unit 152 configured to transmit the HELLO packet constructed by the constructing unit, so that a node receiving the HELLO packet authenticates the multiple reservation slots requested by the node according to information contained in the HELLO packet;

wherein the correlation information of the multiple reservation slots requested by the node includes: an address of the node, an address of a receiving node of a data packet to be transmitted by the node, and a start slot index and a slot length of the multiple reservation slots requested by the node; and the correlation information of the multiple reservation slots requested by the at least one neighbor node includes: an address of the neighbor node, an address of a receiving node of a data packet to be transmitted by the neighbor node, a start slot index and a slot length of the multiple reservation slots requested by the neighbor node, a distance from the neighbor node to the local node, and confirmation information of the multiple reservation slots requested by the neighbor node.

In an embodiment, the correlation information of the multiple reservation slots requested by the local node further includes an interleaving period of the local node, and correspondingly, the correlation information of the multiple reservation slots requested by the neighbor node further includes an interleaving period of the neighbor node.

In an embodiment, the constructing unit 151 includes:

a first obtaining module 1511 configured to obtain the address of the receiving node of the data packet to be transmitted by the local node by selecting the receiving node of the data packet to be transmitted by the local node from a routing table;

a second obtaining module 1512 configured to obtain the start slot index and the slot length of the requested multiple reservation slots by determining the requested multiple reservation slots according to local reservation history information and/or a local request table saved by the local node; and a constructing module 1513 configured to obtain the correlation information of the multiple reservation slots requested by the local node according to the address of the receiving node of the data packet to be transmitted by the local node, the start slot index and the slot length of the requested multiple reservation slots and the address of the local node.

Wherein, the constructing unit 151 further includes:

a third obtaining module 1514 configured to select an information entry of the at least one neighbor node from a local request table according to a predetermined policy and take it as the correlation information of the multiple reservation slots requested by the at least one neighbor node of the node (the RES part).

In this embodiment, the second obtaining module 1512 includes: a calculating module 15121, a determining module 15122, a first selecting module 15123, a second selecting module 15124 and a third selecting module 15125; wherein, the calculating module 15121 is configured to calculate a needed slot length; wherein, the calculating module 15121 may calculate the needed slot length according to a sum of lengths of slots reserved by all children nodes of the local node, and may also calculate the needed slot length according to traffic of neighbor nodes in a collision domain of the local node, which is as described above, and shall not be described herein any further;

the determining module 15122 is configured to determine whether the needed slot length varies according to locally saved reservation history information;

the first selecting module 15123 is configured to select idle slots according to the calculated needed slot length when the needed slot length varies, and determine the requested multiple reservation slots according to the selected idle slots;

the second selecting module 15124 is configured to determine the requested multiple reservation slots according to the reservation history information when the needed slot length does not vary and the previously selected slots are determined as being valid according to the reservation history information;

and the third selecting module 15125 is configured to select idle slots according to the calculated needed slot length and determine the requested multiple reservation slots according to the selected idle slots when the needed slot length does not vary but the previously selected slots are determined as being invalid according to the reservation history information.

Wherein, in selecting the idle slots, the first selecting module 15123 and the third selecting module 15125 may first determine a start slot, and select M consecutive unoccupied slots starting from the start slot according to information in the local request table and take them as the idle slots; where, M is less than or equal to the calculated needed slot length.

Wherein, in determining the start slot, an unused slot may be randomly selected from a preconfigured slot set and is taken as the start slot; or a first unused slot is selected from a preconfigured slot set and is taken as the start slot; or a slot at a middle position within a maximum unused slot interval is selected from a preconfigured slot set and is taken as the start slot; or a slot with slot index being a function of the address of the local node is selected from a preconfigured slot set and is taken as the start slot; or an unused slot is selected from a slot set to which a hop count of the local node corresponds according to the hop count of the local node and is taken as the start slot. The preconfigured slot set here may be a data part of a designated frame in a predetermined HELLO packet interval, and may also be data parts of all frames in a predetermined HELLO packet interval.

Wherein, in selecting M consecutive unoccupied slots, whether all slots in a range from the start slot to an ending slot passing the needed slot length are idle may be determined according to the information in the local request table, and if all the slots in the range are idle, it may be determined that the M consecutive slots containing the start slot are the idle slots. Wherein, M is the needed slot length. Wherein, if at least one slot in the range is occupied, a first idle slot after the last occupied slot in the range is taken as the start slot, and idle slots are re-selected. Wherein, in determining that there are no M consecutive unoccupied idle slots according to the information in the local request table, M is reduced, and idle slots are re-selected taking the reduced M as the needed slot length.

Wherein, the above composition of the second obtaining module 1512 is an example only. In an embodiment where the reservation history information is not saved by the local node, it needs only to select idle slots according to the local request table, and in an embodiment where the local request table is not saved (the local request table is empty), idle slots may be selected randomly or according to the predetermined policy.

In this embodiment, the third obtaining module 1514 may select entries of 1~(n−1)-hop neighbor nodes within an n-hop collision domain of the local node from the local request table as the correlation information of the multiple reservation slots requested by the at least one neighbor node, or select entries of all one-hop neighbor nodes within an n-hop collision domain of the local node and entries with confirmation information being consent in entries of 2~(n−1)-hop neighbor nodes from the local request table as the correlation information of the multiple reservation slots requested by the at least one neighbor node.

In this embodiment, the node may further include a processing unit 153 configured to authenticate reservation slots requested by a sender of a received HELLO packet according to the received HELLO packet, and/or determine whether the multiple reservation slots requested by the local node are valid, and/or update the local request table, and/or update the local reservation history information.

Wherein, the received HELLO packet includes only correlation information of the multiple reservation slots requested by the transmission node of the HELLO packet, or the received HELLO packet includes correlation information of the multiple reservation slots requested by the transmission node of the received HELLO packet and correlation information of the multiple reservation slots requested by at least one neighbor node of the transmission node of the received HELLO packet.

Wherein, the processing unit 153 may include:

a first traversing module 1531 configured to traverse the correlation information of the multiple reservation slots requested by the transmission node of the HELLO packet in the HELLO packet (REQ part of the HELLO packet); and a first processing module 1532 configured to grant objection to the multiple reservation slots requested by the transmission node of the HELLO packet when the multiple reservation slots requested by the transmission node of the HELLO packet collide with the multiple reservation slots requested by the 1~(n−1)-hop neighbor nodes with confirmation information being consent in the local request table, and add an information entry corresponding to the correlation information of the multiple reservation slots requested by the transmission node of the HELLO packet into the local request table, or grant consent to the multiple reservation slots requested by the transmission node of the HELLO packet when the multiple reservation slots requested by the transmission node of the HELLO packet do not collide with the multiple reservation slots requested by the 1~(n−1)-hop neighbor nodes with confirmation information being consent in the local request table, and add an information entry corresponding to the correlation information of the multiple reservation slots requested by the transmission node of the HELLO packet into the local request table;

wherein, the first processing module 1532 is configured to judge whether the multiple reservation slots requested by the transmission node of the HELLO packet collide with the multiple reservation slots requested by the local node when the multiple reservation slots requested by the transmission node of the HELLO packet do not collide with the multiple reservation slots requested by the 1~(n−1) hops neighbor nodes with confirmation information being consent in the local request table, if they collide, determines that the multiple reservation slots requested by the local node are invalid and modifies the local reservation history information, and if they do not collide, determines that the multiple reservation slots requested by the local node are valid and keeps the local reservation history information unchanged.

Wherein, the processing unit 153 may further include:

a second traversing module 1533 configured to traverse the correlation information of the multiple reservation slots requested by each neighbor node of the transmission node of the received HELLO packet in the received HELLO packet (the RES part of the HELLO packet, including at least one RES entry); and a second processing module 1534 configured to determine whether the multiple reservation slots requested by the local node are valid according to the confirmation information indicated by the correlation information of the multiple reservation slots requested by the neighbor node when local source ID indicated by the correlation information of the multiple reservation slots requested by the neighbor node is the ID of the local node, and update the local reservation history information accordingly; and update the local request table according to the correlation information of the multiple reservation slots requested by the neighbor node when the local source ID indicated by the correlation information of the multiple reservation slots requested by the neighbor node is not the ID of the local node;

wherein, the second processing module 1534 is configured to determine whether the correlation information of the multiple reservation slots requested by the neighbor node has been saved according to the information entries in the local request table, adds the correlation information of the multiple reservation slots requested by the neighbor node into the local request table if it has not been saved and adds 1 to the distance to which the correlation information corresponds; if it has been saved, updates the correlation information of the neighbor node in the local request table and adds 1 to the distance to which the correlation information corresponds when the distance to which the correlation information of the neighbor node in the HELLO packet corresponds is less than the distance to which the correlation information of the neighbor node in the local request table corresponds; and judges whether the confirmation information of the multiple reservation slots requested by the neighbor node in the HELLO packet is consent when the distance to which the correlation information of the neighbor node in the HELLO packet corresponds is less than the distance to which the correlation information of the neighbor node in the local request table corresponds, and if yes, updates confirmation information of all one-hop neighbor nodes in the local request table.

By reserving slot with the nodes in this embodiment, utilization of slot allocation may be improved.

The preferred embodiments of the present invention are described above with reference to the drawings. The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

The above literal description and drawings show various features of the present invention. It should be understood that a person of ordinary skill in the art may prepare suitable computer codes to carry out each of the steps and processes described above and illustrated in the drawings. It should also be understood that the above-described terminals, computers, servers, and networks, etc. may be any type, and the computer codes may be prepared according to the disclosure contained herein to carry out the present invention by using the devices.

For the implementation of the present invention containing the above embodiments, following supplements are further disclosed.

Supplement 1. A method for assigning slot, including:
constructing an HELLO packet, the HELLO packet including correlation information of multiple reservation slots requested by a local node, or including correlation information of multiple reservation slots requested by a local node and correlation information of multiple reservation slots requested by at least one neighbor node of the local node; and transmitting the HELLO packet, so that a node receiving the HELLO packet authenticates the multiple reservation slots requested by the local node according to information contained in the HELLO packet.

Supplement 2. The method according to supplement 1, wherein, the correlation information of the multiple reservation slots requested by the local node includes: an address of the local node, an address of a receiving node of a data packet to be transmitted by the local node, a start slot index and a slot length of the multiple reservation slots requested by the local node;

and the correlation information of the multiple reservation slots requested by the neighbor node includes: an address of the neighbor node, an address of a receiving node of a data packet to be transmitted by the neighbor node, a start node index and a slot length of the multiple reservation slots requested by the neighbor node, a distance from the neighbor node to the local node, and confirmation information of the multiple reservation slots requested by the neighbor node.

Supplement 3. The method according to supplement 2, wherein, the correlation information of the multiple reservation slots requested by the local node further includes an interleaving period of the local node;

and the correlation information of the multiple reservation slots requested by the neighbor node further includes an interleaving period of the neighbor node.

Supplement 4. The method according to supplement 1, wherein the step of constructing an HELLO packet includes:

selecting the receiving node of a data packet to be transmitted by the local node from a routing table, so as to obtain the address of the receiving node of the data packet to be transmitted by the local node;

determining the requested multiple reservation slots according to local reservation history information and/or a local request table, so as to obtain the start slot index and the slot length of the requested multiple reservation slots; and obtaining the correlation information of the multiple reservation slots requested by the local node according to the address of the receiving node of the data packet to be transmitted by the local node, the start slot index and the slot length of the requested multiple reservation slots and the address of the local node;

Supplement 5. The method according to supplement 4, wherein the step of constructing an HELLO packet further includes:

selecting an information entry of the at least one neighbor node from the local request table according to a predetermined policy, and taking it as the correlation information of the multiple reservation slots requested by the at least one neighbor node.

Supplement 6. The method according to supplement 4, wherein the step of determining requested multiple reservation slots includes:

calculating a needed slot length;

determining whether the needed slot length varies according to the local reservation history information;

selecting idle slots according to the calculated needed slot length if the needed slot length varies, and determining the requested multiple reservation slots according to the selected idle slots; and determining the requested multiple reservation slots according to according to the reservation history information if the needed slot length does not vary and the previously requested reservation slots are determined as being valid according to the reservation history information.

selecting idle slots according to the calculated needed slot length and determine the requested multiple reservation slots according to the selected idle slots if the needed slot length does not vary but the previously requested reservation slots are determined as being invalid according to the reservation history information.

Supplement 7. The method according to supplement 6, wherein the step of calculating a needed slot length includes:

calculating the needed slot length according to a sum of lengths of slots reserved by all children nodes of the local node; or calculating the needed slot length according to traffic of a neighbor node in a collision domain of the local node.

Supplement 8. The method according to supplement 6, wherein the step of selecting idle slots according to the calculated needed slot length includes:

S1: determining a start slot; and

S2: selecting M consecutive unoccupied slots starting from the start slot according to information in the local request table as the idle slots; where, M is less than or equal to the calculated needed slot length.

Supplement 9. The method according to supplement 8, wherein step S1 includes:

randomly selecting an unused slot from a preconfigured slot set as the start slot; or selecting a first unused slot from a preconfigured slot set as the start slot; or selecting a slot at a middle position within a maximum unused slot interval from a preconfigured slot set as the start slot; or selecting a slot with slot index being a function of the address of the local node from a preconfigured slot set as the start slot; or selecting an unused slot from a slot set to which a hop count of the local node corresponds according to the hop count of the local node as the start slot.

Supplement 10. The method according to supplement 9, wherein, the preconfigured slot set is a data part of a designated frame in a predetermined HELLO packet interval; or the preconfigured slot set is data parts of all frames in a predetermined HELLO packet interval.

Supplement 11. The method according to supplement 8, wherein step S2 includes:

determining whether all slots in a range from the start slot to an ending slot passing the needed slot length are idle according to the information in the local request table; and determining that M consecutive slots containing the start slot are the idle slots if all the slots in the range are idle; where, M is the needed slot length.

Supplement 12. The method according to supplement 11, wherein, if at least one slot in the range is occupied, a first idle slot after the last occupied slot in the range is taken as the start slot, and turn back to step S2.

Supplement 13. The method according to supplement 12, wherein, if it is determined according to the information in the local request table that there are no M consecutive unoccupied idle slots, M is reduced, and turn back to step S1.

Supplement 14. The method according to supplement 5, wherein the step of selecting an information entry of at least one neighbor node from the local request table includes:

selecting entries of 1~(n−1)-hop neighbor nodes within an n-hop collision domain of the local node from the local request table as the correlation information of the multiple reservation slots requested by the at least one neighbor node; or selecting entries of all one-hop neighbor nodes within an n-hop collision domain of the local node and entries with confirmation information being consent in entries of 2~(n−1)-hop neighbor nodes within an n-hop collision domain of the local node from the local request table as the correlation information of the multiple reservation slots requested by the at least one neighbor node.

Supplement 15. The method according to supplement 1, wherein the method further includes:

authenticating multiple reservation slots requested by a transmission node of a received HELLO packet according to the received HELLO packet, and/or determining whether the multiple reservation slots requested by the local node are valid, and/or updating a local request table or local reservation history information;

wherein the received HELLO packet includes only correlation information of the multiple reservation slots requested by the transmission node of the received HELLO packet, or the received HELLO packet includes correlation information of the multiple reservation slots requested by the transmission node of the received HELLO packet and correlation information of the multiple reservation slots requested by at least one neighbor node of the transmission node of the received HELLO packet.

Supplement 16. The method according to supplement 15, wherein if the received HELLO packet includes only correlation information of the multiple reservation slots requested by the transmission node of the received HELLO packet, after receiving the HELLO packet, the method further includes:

traversing the correlation information of the multiple reservation slots requested by the transmission node of the received HELLO packet in the received HELLO packet;

granting objection to the multiple reservation slots requested by the transmission node of the received HELLO packet when the multiple reservation slots requested by the transmission node of the received HELLO packet collide with the multiple reservation slots requested by the 1~(n−1)-hop neighbor nodes with confirmation information being consent in the local request table, and adding an information entry corresponding to the correlation information of the multiple reservation slots requested by the transmission node of the received HELLO packet into the local request table;

granting consent to the multiple reservation slots requested by the transmission node of the received HELLO packet when the multiple reservation slots requested by the transmission node of the received HELLO packet do not collide with the multiple reservation slots requested by the 1~(n−1)-hop neighbor nodes with confirmation information being consent in the local request table, and adding an information entry corresponding to the correlation information of the multiple reservation slots requested by the transmission node of the received HELLO packet into the local request table;

judging whether the multiple reservation slots requested by the transmission node of the received HELLO packet collide with the multiple reservation slots requested by the local node when the multiple reservation slots requested by the transmission node of the received HELLO packet do not collide with the multiple reservation slots requested by the 1~(n−1) hops neighbor nodes with confirmation information being consent in the local request table, if they collide, determining that the multiple reservation slots requested by the local node are invalid and modifying the local reservation history information, and if they do not collide, determining that the multiple reservation slots requested by the local node are valid and keeping the local reservation history information unchanged.

Supplement 17. The method according to supplement 16, wherein if the received HELLO packet further includes the correlation information of the multiple reservation slots requested by the at least one neighbor node of the transmission node of the received HELLO packet, before traversing the correlation information of the multiple reservation slots requested by the transmission node of the received HELLO packet, the method further includes:

traversing the correlation information of the multiple reservation slots requested by each neighbor node of the transmission node of the received HELLO packet in the received HELLO packet;

determining whether the multiple reservation slots requested by the local node are valid according to the confirmation information indicated by the correlation information of the multiple reservation slots requested by the neighbor node when local source ID indicated by the correlation information of the multiple reservation slots requested by the neighbor node is the ID of the local node, and updating the local reservation history information accordingly; and updating the local request table according to the correlation information of the multiple reservation slots requested by the neighbor node when the local source ID indicated by the correlation information of the multiple reservation slots requested by the neighbor node is not the ID of the local node.

Supplement 18. The method according to supplement 17, wherein the step of determining whether the multiple reservation slots requested by the local node are valid according to the confirmation information indicated by the correlation information of the multiple reservation slots requested by the neighbor node includes:

determining that the reservation slots requested by the local node are valid if the confirmation information indicated by the correlation information of the multiple reservation slots requested by the neighbor node is consent, and determining that the reservation slot requested by the local node are invalid if the confirmation information indicated by the correlation information of the multiple reservation slots requested by the neighbor node is objection.

Supplement 19. The method according to supplement 17, wherein the step of updating the local request table according to the correlation information of the multiple reservation slots requested by the neighbor node includes:

determining whether the correlation information of the multiple reservation slots requested by the neighbor node has been saved according to the information entries in the local request table, adding the correlation information of the multiple reservation slots requested by the neighbor node into the local request table if it has not been saved and adding 1 to the distance to which the correlation information corresponds; if it has been saved, updating the correlation information of the neighbor node in the local request table and adding 1 to the distance to which the correlation information corresponds when the distance to which the correlation information of the neighbor node in the HELLO packet corresponds is less than the distance to which the correlation information of the neighbor node in the local request table corresponds.

Supplement 20. The method according to supplement 19, wherein when the distance to which the correlation information of the neighbor node in the HELLO packet corresponds is less than the distance to which the correlation information of the neighbor node in the local request table corresponds, the method further includes:

judging whether the confirmation information of the multiple reservation slots requested by the neighbor node in the HELLO packet is consent, and if yes, updating confirmation information of all one-hop neighbor nodes in the local request table.

Supplement 21. A node, including:

a constructing unit configured to construct an HELLO packet, the HELLO packet including correlation information of multiple reservation slots requested by the node, or including correlation information of multiple reservation slots requested by the node and correlation information of multiple reservation slots requested by at least one neighbor node of the node; and a transmitting unit configured to transmit the HELLO packet constructed by the constructing unit, so that a node receiving the HELLO packet authenticates the multiple reservation slots requested by the node according to information contained in the HELLO packet.

Supplement 22. The node according to supplement 21, wherein, the correlation information of the multiple reservation slots requested by the node includes: an address of the node, an address of a receiving node of a data packet to be transmitted by the node, and a start slot index and a slot length of the multiple reservation slots requested by the node;

and the correlation information of the multiple reservation slots requested by the neighbor node includes: an address of the neighbor node, an address of a receiving node of a data packet to be transmitted by the neighbor node, a start slot index and a slot length of the multiple reservation slots requested by the neighbor node, a distance from the neighbor node to the local node, and confirmation information of the multiple reservation slots requested by the neighbor node.

Supplement 23. The node according to supplement 22, wherein, the correlation information of the multiple reservation slots requested by the local node further includes an interleaving period of the local node;

and the correlation information of the multiple reservation slots requested by the neighbor node further includes an interleaving period of the neighbor node.

Supplement 24. The node according to supplement 21, wherein the constructing unit includes:

a first obtaining module configured to obtain the address of the receiving node of the data packet to be transmitted by the local node by selecting the receiving node of the data packet to be transmitted by the local node from a routing table;

a second obtaining module configured to obtain the start slot index and the slot length of the requested multiple reservation slots by determining the requested multiple reservation slots according to local reservation history information and/or a local request table; and a constructing module configured to obtain the correlation information of the multiple reservation slots requested by the local node according to the address of the receiving node of the data packet to be transmitted by the local node, the start slot index and the slot length of the requested multiple reservation slots and the address of the local node.

Supplement 25. The node according to supplement 24, wherein the constructing unit further includes:

a third obtaining module configured to select an information entry of the at least one neighbor node from a local request table according to a predetermined policy and take it as the correlation information of the multiple reservation slots requested by the at least one neighbor node.

Supplement 26. The node according to supplement 23, wherein the second obtaining module includes:

a calculating module configured to calculate a needed slot length;

a determining module configured to determine whether the needed slot length varies according to the reservation history information;

a first selecting module configured to select idle slots according to the calculated needed slot length when the needed slot length varies, and determine the requested multiple reservation slots according to the selected idle slots;

a second selecting module configured to determine the requested multiple reservation slots according to the reservation history information when the needed slot length does not vary and the previously requested multiple reservation slots are determined as being valid according to the reservation history information; and a third selecting module configured to select idle slots according to the calculated needed slot length and determine the requested multiple reservation slots according to the selected idle slots when the needed slot length does not vary but the previously requested multiple reservation slots are determined as being invalid according to the reservation history information.

Supplement 27. The node according to supplement 26, wherein the calculating module calculates the needed slot length according to a sum of lengths of slots reserved by all children nodes of the local node, or the calculating module calculates the needed slot length according to traffic of a neighbor node in a collision domain of the local node.

Supplement 28. The node according to supplement 26, wherein in selecting the idle slots, the first selecting module or the third selecting module first determines a start slot, and selects M consecutive unoccupied slots starting from the start slot and take them as the idle slots according to information of the local request table; where, M is less than or equal to the calculated needed slot length.

Supplement 29. The node according to supplement 28, wherein the first selecting module or the third selecting module randomly selects an unused slot from a preconfigured slot set as the start slot; or selects a first unused slot from a preconfigured slot set as the start slot; or selects a slot at a middle position within a maximum unused slot interval from a preconfigured slot set as the start slot; or selects a slot with slot index being a function of the address of the local node from a preconfigured slot set as the start slot; or selects an unused slot from a slot set to which a hop count of the local node corresponds according to the hop count of the local node as the start slot.

Supplement 30. The node according to supplement 29, wherein the preconfigured slot set is a data part of a designated frame in a predetermined HELLO packet interval; or the preconfigured slot set is data parts of all frames in a predetermined HELLO packet interval.

Supplement 31. The node according to supplement 28, wherein the first selecting module or the third selecting module determines whether all slots in a range from the start slot to an ending slot passing the needed slot length are idle according to the information in the local request table, and determines that M consecutive slots containing the start slot are the idle slots when all the slots in the range are idle; where, M is the needed slot length.

Supplement 32. The node according to supplement 31, wherein when at least one slot in the range is occupied, the first selecting module or the third selecting module takes a first idle slot after the last occupied slot in the range as the start slot, and reselects idle slots.

Supplement 33. The node according to supplement 32, wherein when it is determined according to the information in the local request table that there are no M consecutive unoccupied idle slots, the first selecting module or the third selecting module reduces M, and reselects idle slots taking the reduced M as the needed slot length.

Supplement 34. The node according to supplement 25, wherein the third obtaining module is configured to: select entries of 1~(n–1)-hop neighbor nodes within an n-hop collision domain of the local node from the local request table as the correlation information of the multiple reservation slots requested by the at least one neighbor node; or select entries of all one-hop neighbor nodes within an n-hop collision domain of the local node and entries with confirmation information being consent in entries of 2~(n–1)-hop neighbor nodes within an n-hop collision domain of the local node from the local request table as the correlation information of the multiple reservation slots requested by the at least one neighbor node.

Supplement 35. The node according to supplement 21, wherein the node further includes:

a processing unit configured to authenticate multiple reservation slots requested by a transmission node of a received HELLO packet according to the received HELLO packet, and/or determine whether the multiple reservation slots requested by the local node are valid, and/or update the local request table, and/or update the local reservation history information;

wherein the received HELLO packet includes only correlation information of the multiple reservation slots requested by the transmission node of the received HELLO packet, or the received HELLO packet includes correlation information of the multiple reservation slots requested by the transmission node of the received HELLO packet and correlation information of the multiple reservation slots requested by at least one neighbor node of the transmission node of the received HELLO packet.

Supplement 36. The node according to supplement 35, wherein the processing unit includes:

a first traversing module configured to traverse the correlation information of the multiple reservation slots requested by the transmission node of the HELLO packet in the received HELLO packet; and a first processing module configured to grant objection to the multiple reservation slots requested by the transmission node of the received HELLO packet when the multiple reservation slots requested by the transmission node of the received HELLO packet collide with the multiple reservation slots requested by the 1~(n–1)-hop neighbor nodes with confirmation information being consent in the local request table, and add an information entry corresponding to the correlation information of the multiple reservation slots requested by the transmission node of the received HELLO packet into the local request table; and grant consent to the multiple reservation slots requested by the transmission node of the received HELLO packet when the multiple reservation slots requested by the transmission node of the received HELLO packet do not collide with the multiple reservation slots requested by the 1~(n–1)-hop neighbor nodes with confirmation information being consent in the local request table, and add an information entry corresponding to the correlation information of the multiple reservation slots requested by the transmission node of the received HELLO packet into the local request table.

Supplement 37. The node according to supplement 36, wherein the first processing module judges whether the multiple reservation slots requested by the transmission node of the received HELLO packet collide with the multiple reservation slots requested by the local node when the multiple reservation slots requested by the transmission node of the received HELLO packet do not collide with the multiple reservation slots requested by the 1~(n−1) hops neighbor nodes with confirmation information being consent in the local request table, if they collide, determines that the multiple reservation slots requested by the local node are invalid and modifies the local reservation history information, and if they do not collide, determines that the multiple reservation slots requested by the local node are valid and keeps the local reservation history information unchanged.

Supplement 38. The node according to supplement 36 or 37, wherein the processing unit further includes:

a second traversing module configured to traverse the correlation information of the multiple reservation slots requested by each neighbor node of the transmission node of the received HELLO packet in the received HELLO packet; and a second processing module configured to determine whether the multiple reservation slots requested by the local node are valid according to the confirmation information indicated by the correlation information of the multiple reservation slots requested by the neighbor node when local source ID indicated by the correlation information of the multiple reservation slots requested by the neighbor node is the ID of the local node, and update the local reservation history information accordingly; and update the local request table according to the correlation information of the multiple reservation slots requested by the neighbor node when the local source ID indicated by the correlation information of the multiple reservation slots requested by the neighbor node is not the ID of the local node.

Supplement 39. The node according to supplement 38, wherein in determining whether the reservation slots requested by the local node are valid according to the confirmation information indicated by the correlation information of the multiple reservation slots requested by the neighbor node, the second processing module determines that the reservation slots requested by the local node are valid if the confirmation information indicated by the correlation information of the multiple reservation slots requested by the neighbor node is consent, and determines that the reservation slots requested by the local node are invalid if the confirmation information indicated by the correlation information of the multiple reservation slots requested by the neighbor node is objection.

Supplement 40. The node according to supplement 38, wherein in updating the local request table according to the correlation information of the multiple reservation slots requested by the neighbor node, the second processing module determines whether the correlation information of the multiple reservation slots requested by the neighbor node has been saved according to the information entries in the local request table, adds the correlation information of the multiple reservation slots requested by the neighbor node into the local request table if it has not been saved and adds 1 to the distance to which the correlation information corresponds; if it has been saved, updates the correlation information of the neighbor node in the local request table and adds 1 to the distance to which the correlation information corresponds when the distance to which the correlation information of the neighbor node in the HELLO packet corresponds is less than the distance to which the correlation information of the neighbor node in the local request table corresponds; and judges whether the confirmation information of the multiple reservation slots requested by the neighbor node in the HELLO packet is consent when the distance to which the correlation information of the neighbor node in the HELLO packet corresponds is less than the distance to which the correlation information of the neighbor node in the local request table corresponds, and if yes, updates confirmation information of all one-hop neighbor nodes in the local request table.

The invention claimed is:

1. A node, comprising:
a constructing unit configured to construct an HELLO packet, the HELLO packet comprising correlation information of multiple reservation slots requested by the node and correlation information of multiple reservation slots requested by at least one neighbor node of the node; and
a transmitting unit configured to transmit the HELLO packet constructed by the constructing unit, so that a node receiving the HELLO packet authenticates the multiple reservation slots requested by the node according to information contained in the HELLO packet.

2. The node according to claim 1, wherein,
the correlation information of the multiple reservation slots requested by the node comprises: an address of the node, an address of a receiving node of a data packet to be transmitted by the node, and a start slot index and a slot length of the multiple reservation slots requested by the node;
and the correlation information of the multiple reservation slots requested by the neighbor node comprises: an address of the neighbor node, an address of a receiving node of a data packet to be transmitted by the neighbor node, a start slot index and a slot length of the multiple reservation slots requested by the neighbor node, a distance from the neighbor node to a local node, and confirmation information of the multiple reservation slots requested by the neighbor node.

3. The node according to claim 2, wherein,
the correlation information of the multiple reservation slots requested by the local node further includes an interleaving period of the local node; and
the correlation information of the multiple reservation slots requested by the neighbor node further includes an interleaving period of the neighbor node.

4. The node according to claim 1, wherein the constructing unit comprises:
a first obtaining module configured to obtain the address of the receiving node of the data packet to be transmitted by the local node by selecting the receiving node of the data packet to be transmitted by the local node from a routing table;
a second obtaining module configured to obtain the start slot index and the slot length of the requested multiple reservation slots by determining the requested multiple reservation slots according to local reservation history information and/or a local request table; and
a constructing module configured to obtain the correlation information of the multiple reservation slots requested by the local node according to the address of the receiving node of the data packet to be transmitted by the local node, the start slot index and the slot length of the requested multiple reservation slots and the address of the local node.

5. The node according to claim 4, wherein the constructing unit further comprises:
a third obtaining module configured to select an information entry of the at least one neighbor node from the local request table according to a predetermined policy and take it as the correlation information of the multiple reservation slots requested by the at least one neighbor node.

6. The node according to claim 3, wherein the second obtaining module comprises:
a calculating module configured to calculate a needed slot length;
a determining module configured to determine whether the needed slot length varies according to the reservation history information;
a first selecting module configured to select idle slots according to the calculated needed slot length when the needed slot length varies, and determine the requested multiple reservation slots according to the selected idle slots;
a second selecting module configured to determine the requested multiple reservation slots according to the reservation history information when the needed slot length does not vary and the previously selected slots are determined as being valid according to the reservation history information; and
a third selecting module configured to select idle slots according to the calculated needed slot length and determine the requested multiple reservation slots according to the selected idle slots when the needed slot length does not vary but the previously selected slots are determined as being invalid according to the reservation history information.

7. The node according to claim 6, wherein the calculating module calculates the needed slot length according to a sum of lengths of slots reserved by all children nodes of the local node, or the calculating module calculates the needed slot length according to traffic of a neighbor node in a collision domain of the local node.

8. The node according to claim 6, wherein in selecting the idle slots, the first selecting module or the third selecting module first determines a start slot, and selects M consecutive unoccupied slots starting from the start slot and take them as the idle slots according to information of the local request table; where, M is less than or equal to the calculated needed slot length.

9. The node according to claim 8, wherein the first selecting module or the third selecting module randomly selects an unused slot from a preconfigured slot set as the start slot, or selects a first unused slot from a preconfigured slot set as the start slot, or selects a slot at a middle position within a maximum unused slot interval from a preconfigured slot set as the start slot, or selects a slot with slot index being a function of the address of the local node from a preconfigured slot set as the start slot, or selects an unused slot from a slot set to which a hop count of the local node corresponds according to the hop count of the local node as the start slot.

10. The node according to claim 9, wherein the preconfigured slot set is a data part of a designated frame in a predetermined HELLO packet interval; or the preconfigured slot set is data parts of all frames in a predetermined HELLO packet interval.

11. The node according to claim 8, wherein the first selecting module or the third selecting module determines whether all slots in a range from the start slot to an ending slot passing the needed slot length are idle according to the information in the local request table, and determines that M consecutive slots containing the start slot are the idle slots when all the slots in the range are idle; where, M is the needed slot length.

12. The node according to claim 11, wherein when at least one slot in the range is occupied, the first selecting module or the third selecting module takes a first idle slot after the last occupied slot in the range as the start slot, and reselects idle slots.

13. The node according to claim 12, wherein when it is determined according to the information in the local request table that there are no M consecutive unoccupied idle slots, the first selecting module or the third selecting module reduces M, and reselects idle slots taking the reduced M as the needed slot length.

14. The node according to claim 5, wherein the third obtaining module is configured to select entries of 1~(n−1)-hop neighbor nodes within an n-hop collision domain of the local node from the local request table as the correlation information of the multiple reservation slots requested by the at least one neighbor node, or select entries of all one-hop neighbor nodes within an n-hop collision domain of the local node and entries with confirmation information being consent in entries of 2~(n−1)-hop neighbor nodes within an n-hop collision domain of the local node from the local request table as the correlation information of the multiple reservation slots requested by the at least one neighbor node.

15. The node according to claim 1, wherein the node further comprises:
a processing unit configured to authenticate multiple reservation slots requested by a transmission node of a received HELLO packet according to the received HELLO packet, and/or determine whether the multiple reservation slots requested by the local node are valid, and/or update the local request table, and/or update the local reservation history information;
wherein the received HELLO packet comprises only correlation information of the multiple reservation slots requested by the transmission node of the received HELLO packet, or the received HELLO packet comprises correlation information of the multiple reservation slots requested by the transmission node of the received HELLO packet and correlation information of the multiple reservation slots requested by at least one neighbor node of the transmission node of the received HELLO packet.

16. The node according to claim 15, wherein the processing unit comprises:
a first traversing module configured to traverse the correlation information of the multiple reservation slots requested by the transmission node of the received HELLO packet in the received HELLO packet; and
a first processing module configured to grant objection to the multiple reservation slots requested by the transmission node of the received HELLO packet when the multiple reservation slots requested by the transmission node of the received HELLO packet collide with the multiple reservation slots requested by the 1~(n−1)-hop neighbor nodes with confirmation information being consent in the local request table, and add an information entry corresponding to the correlation information of the multiple reservation slots requested by the transmission node of the received HELLO packet into the local request table, or grant consent to the multiple reservation slots requested by the transmission node of the received HELLO packet when the multiple reservation slots requested by the transmission node of the received HELLO packet do not collide with the multiple reservation slots requested by the 1~(n−1)-hop neighbor nodes with confirmation information being consent in the local request table, and add an information entry corresponding to the correlation information of the multiple reservation slots requested by the transmission node of the received HELLO packet into the local request table.

17. The node according to claim 16, wherein, when the multiple reservation slots requested by the transmission node of the received HELLO packet do not collide with the multiple reservation slots requested by the 1~(n−1) hops neighbor nodes with confirmation information being consent in the local request table, the first processing module judges whether the multiple reservation slots requested by the transmission node of the received HELLO packet collide with the multiple reservation slots requested by the local node, if they collide, determines that the multiple reservation slots requested by the local node are invalid and modifies the local reservation history information, and if they do not collide, determines that the multiple reservation slots requested by the local node are valid and keeps the local reservation history information unchanged.

18. The node according to claim 16, wherein the processing unit further comprises:
a second traversing module configured to traverse the correlation information of the multiple reservation slots requested by each neighbor node of the transmission node of the received HELLO packet in the received HELLO packet; and
a second processing module configured to determine whether the multiple reservation slots requested by the local node are valid according to the confirmation information indicated by the correlation information of the multiple reservation slots requested by the neighbor node when local source ID indicated by the correlation information of the multiple reservation slots requested by the neighbor node is the ID of the local node, and update the local reservation history information accordingly; and update the local request table according to the correlation information of the multiple reservation slots requested by the neighbor node when the local source ID indicated by the correlation information of the multiple reservation slots requested by the neighbor node is not the ID of the local node.

19. The node according to claim 18, wherein in determining whether the reservation slots requested by the local node are valid according to the confirmation information indicated by the correlation information of the multiple reservation slots requested by the neighbor node, the second processing module determines that the reservation slots requested by the local node are valid if the confirmation information indicated by the correlation information of the multiple reservation slots requested by the neighbor node is consent, and determines that the reservation slots requested by the local node are invalid if the confirmation information indicated by the correlation information of the multiple reservation slots requested by the neighbor node is objection.

20. The node according to claim 18, wherein in updating the local request table according to the correlation information of the multiple reservation slots requested by the neighbor node, the second processing module determines whether the correlation information of the multiple reservation slots requested by the neighbor node has been saved according to the information entries in the local request table, adds the correlation information of the multiple reservation slots requested by the neighbor node into the local request table if it has not been saved and adds 1 to the distance to which the correlation information corresponds; if it has been saved, updates the correlation information of the neighbor node in the local request table and adds 1 to the distance to which the correlation information corresponds when the distance to which the correlation information of the neighbor node in the HELLO packet corresponds is less than the distance to which the correlation information of the neighbor node in the local request table corresponds; and judges whether the confirmation information of the multiple reservation slots requested by the neighbor node in the HELLO packet is consent when the distance to which the correlation information of the neighbor node in the HELLO packet corresponds is less than the distance to which the correlation information of the neighbor node in the local request table corresponds, and if yes, updates confirmation information of all one-hop neighbor nodes in the local request table.

\* \* \* \* \*